US010732879B2

(12) United States Patent
Niell et al.

(10) Patent No.: US 10,732,879 B2
(45) Date of Patent: Aug. 4, 2020

(54) TECHNOLOGIES FOR PROCESSING NETWORK PACKETS BY AN INTELLIGENT NETWORK INTERFACE CONTROLLER

(71) Applicant: Intel Corporation, Santa Clara, CA (US)

(72) Inventors: Jose Niell, Franklin, MA (US); Brad Burres, Waltham, MA (US); Erik McShane, Phoenix, AZ (US); Naru Dames Sundar, Los Gatos, CA (US); Alain Gravel, Thousand Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 15/721,815

(22) Filed: Sep. 30, 2017

(65) Prior Publication Data

US 2018/0152540 A1 May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*G06F 15/16* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC .... G06F 3/0641; G06F 3/0608; G06F 3/0611; G06F 3/0613; G06F 3/0617;
(Continued)

(56) References Cited

U.S. PATENT DOCUMENTS 6,678,746 B1   1/2004 Russell
7,171,489 B2 * 1/2007 Pinkerton ............... H04L 69/16
                                                    709/230
(Continued)

OTHER PUBLICATIONS

Office Action in German patent application No. 102018006890.1, dated Jun. 27, 2019, including machine translation (11 pages).

*Primary Examiner* — Brian Whipple
*Assistant Examiner* — Hannah S Wang
(74) *Attorney, Agent, or Firm* — Barnes & Thornburg LLP

(57) ABSTRACT

Technologies for processing network packets by a network interface controller (NIC) of a computing device include a network interface, a packet processor, and a controller device of the NIC, each communicatively coupled to a memory fabric of the NIC. The packet processor is configured to receive an event message from the memory fabric and transmit a message to the controller device, wherein the message indicates the network packet has been received and includes the memory fabric location pointer. The controller device is configured to fetch at least a portion of the received network packet from the memory fabric, write an inbound descriptor usable by one or more on-die cores of the NIC to perform an operation on the fetched portion, and restructure the network packet as a function of an outbound descriptor written by the on-die cores subsequent to performing the operation. Other embodiments are described herein.

25 Claims, 19 Drawing Sheets

(51) Int. Cl.

| | | |
|---|---|---|
| *G06F 16/174* | (2019.01) | |
| *G06F 21/57* | (2013.01) | |
| *G06F 21/73* | (2013.01) | |
| *G06F 8/65* | (2018.01) | |
| *H04L 12/24* | (2006.01) | |
| *H04L 29/08* | (2006.01) | |
| *G06F 11/30* | (2006.01) | |
| *G06F 9/50* | (2006.01) | |
| *H03M 7/30* | (2006.01) | |
| *H03M 7/40* | (2006.01) | |
| *H04L 12/26* | (2006.01) | |
| *H04L 12/813* | (2013.01) | |
| *H04L 12/851* | (2013.01) | |
| *G06F 11/07* | (2006.01) | |
| *G06F 11/34* | (2006.01) | |
| *G06F 7/06* | (2006.01) | |
| *G06T 9/00* | (2006.01) | |
| *H03M 7/42* | (2006.01) | |
| *H04L 12/28* | (2006.01) | |
| *H04L 12/46* | (2006.01) | |
| *H04L 29/12* | (2006.01) | |
| *G06F 13/16* | (2006.01) | |
| *G06F 21/62* | (2013.01) | |
| *G06F 21/76* | (2013.01) | |
| *H03K 19/173* | (2006.01) | |
| *H04L 9/08* | (2006.01) | |
| *H04L 12/933* | (2013.01) | |
| *G06F 9/38* | (2018.01) | |
| *G06F 9/48* | (2006.01) | |
| *G06F 12/02* | (2006.01) | |
| *G06F 12/06* | (2006.01) | |
| *G06T 1/20* | (2006.01) | |
| *G06T 1/60* | (2006.01) | |
| *G06F 9/54* | (2006.01) | |
| *G06F 8/656* | (2018.01) | |
| *G06F 8/658* | (2018.01) | |
| *G06F 8/654* | (2018.01) | |
| *G06F 9/4401* | (2018.01) | |
| *H01R 13/453* | (2006.01) | |
| *H01R 13/631* | (2006.01) | |
| *H05K 7/14* | (2006.01) | |
| *H04L 12/911* | (2013.01) | |
| *G06F 11/14* | (2006.01) | |
| *H04L 29/06* | (2006.01) | |
| *G06F 15/80* | (2006.01) | |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC ...... G06F 3/0647; G06F 3/065; G06F 3/0653; G06F 3/067; G06F 8/656; G06F 8/658; G06F 8/654; G06F 16/1744; G06F 7/06; G06F 8/65; G06F 9/3851; G06F 9/3891; G06F 9/4401; G06F 9/4881; G06F 9/5005; G06F 9/5038; G06F 9/505; G06F 11/0709; G06F 11/0751; G06F 11/079; G06F 11/3006; G06F 11/3034; G06F 11/3055; G06F 11/3079; G06F 11/3409; G06F 12/0284; G06F 12/0692; G06F 13/1652; G06F 21/6218; G06F 21/73; G06F 21/76
USPC .................................................. 709/227, 250
See application file for complete search history.

(56) References Cited

U.S. PATENT DOCUMENTS

| | | | |
|---|---|---|---|
| 7,668,984 B2 | 2/2010 | Gregg et al. | |
| 7,689,738 B1* | 3/2010 | Williams | ................ G06F 13/34 710/52 |
| 8,479,220 B2* | 7/2013 | Wilkins | ................ G06F 9/466 719/318 |
| 8,504,728 B1* | 8/2013 | Williams | .............. H04L 9/0637 709/250 |
| 2003/0204634 A1* | 10/2003 | Pinkerton | ............... H04L 29/06 709/250 |
| 2011/0022840 A1* | 1/2011 | Stefan | ................ G06F 12/1491 713/167 |
| 2016/0234080 A1 | 8/2016 | Tripathi | |
| 2017/0201310 A1 | 7/2017 | Nardozza | |

* cited by examiner

US 10,732,879 B2

TECHNOLOGIES FOR PROCESSING NETWORK PACKETS BY AN INTELLIGENT NETWORK INTERFACE CONTROLLER

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

In present packet-switched network architectures, data is transmitted in the form of network packets between computing devices and/or device components at a rapid pace. At a high level, data is packetized into a network packet, which is transmitted by a network interface controller (NIC) of one network computing device and received by a NIC of another network computing device. Upon receipt, the network packet is typically processed, classified, etc., and the payload is typically written to memory (e.g., cache, main memory, etc.). Upon having written the network packet data to memory, the receiving NIC may then notify a host central processing unit (CPU) that the data is available for further processing. However, writing the contents of the network packet data from the NIC to memory for processing by a host CPU can be expensive and introduce latency, or otherwise have some other negative performance impact.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
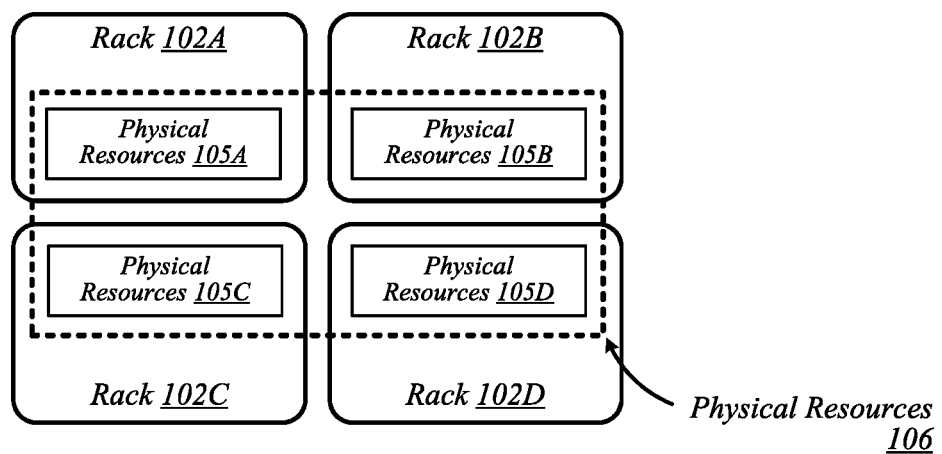
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
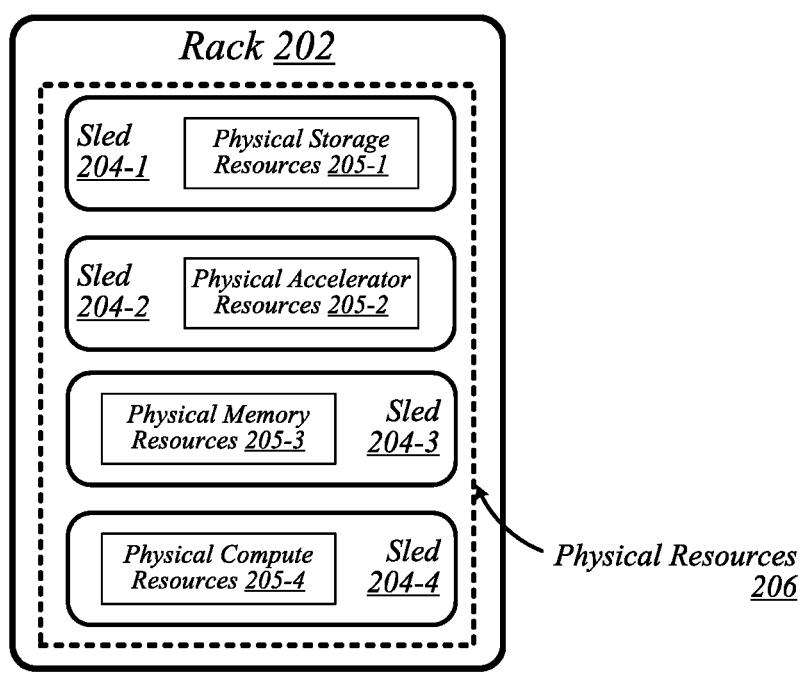
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
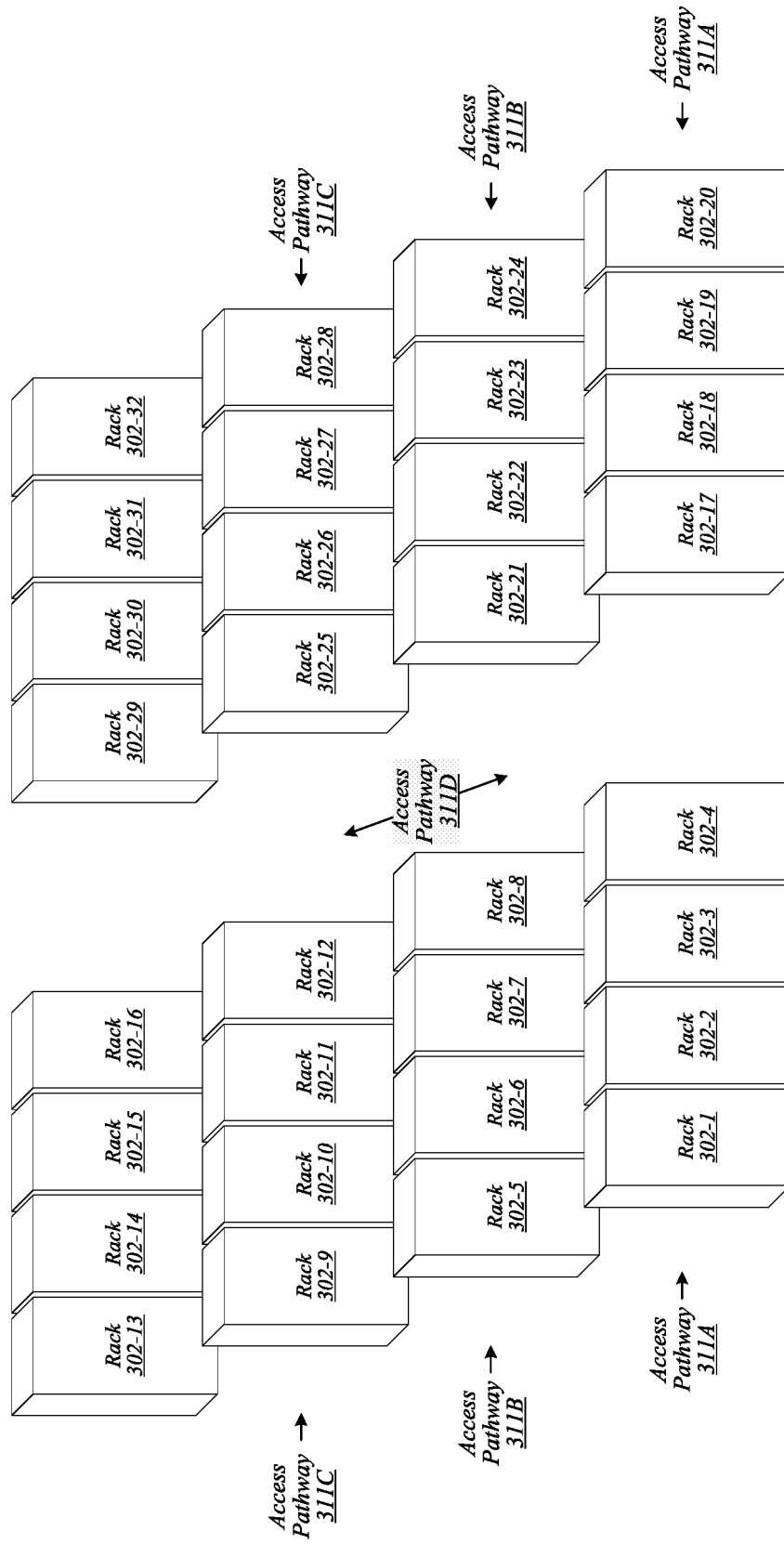
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
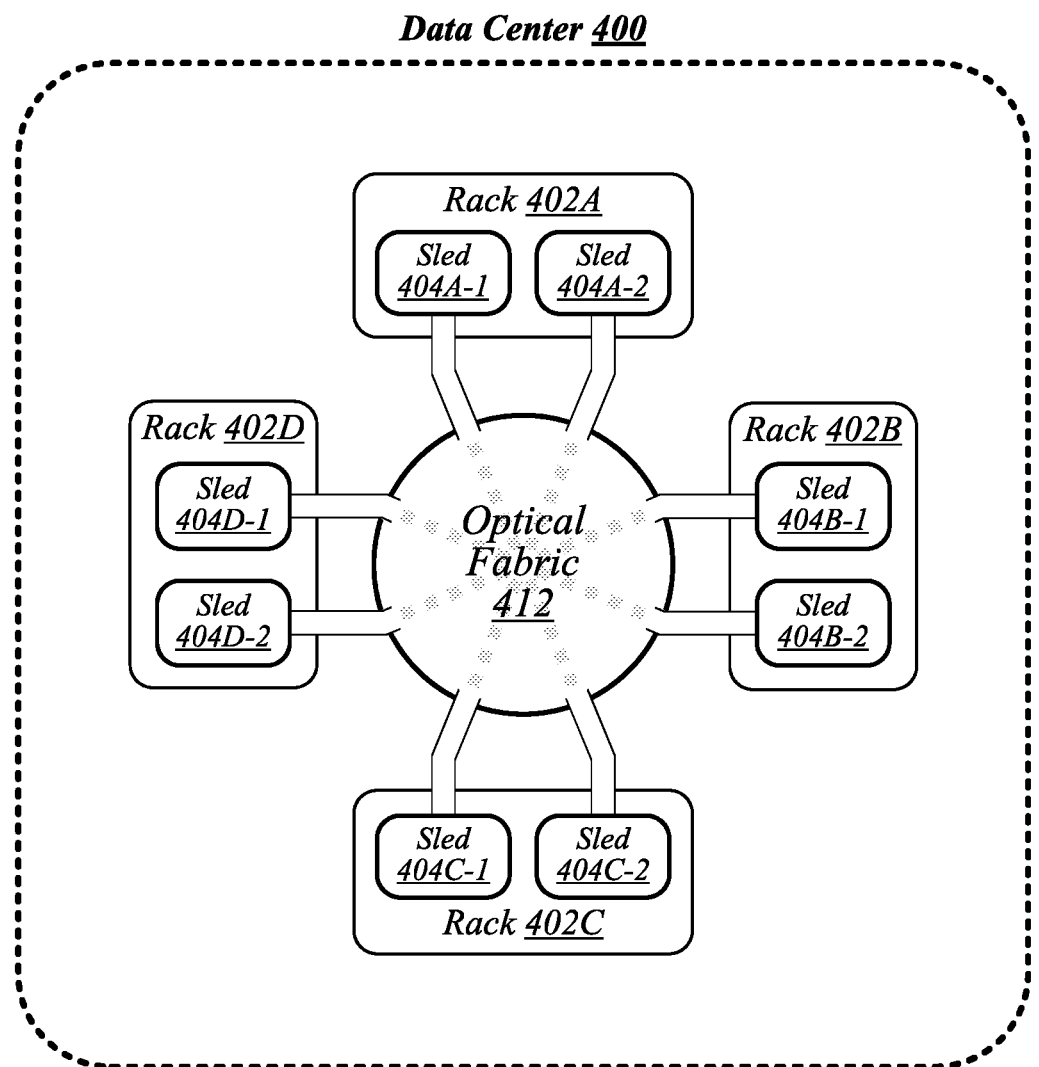
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
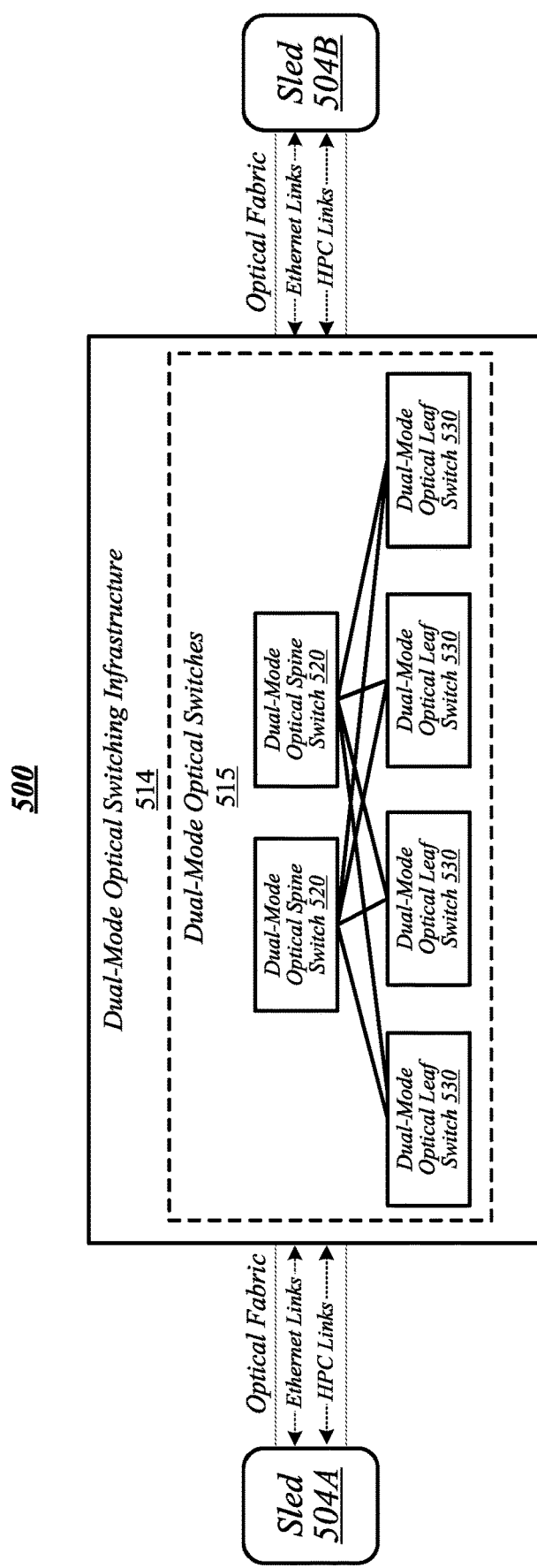
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
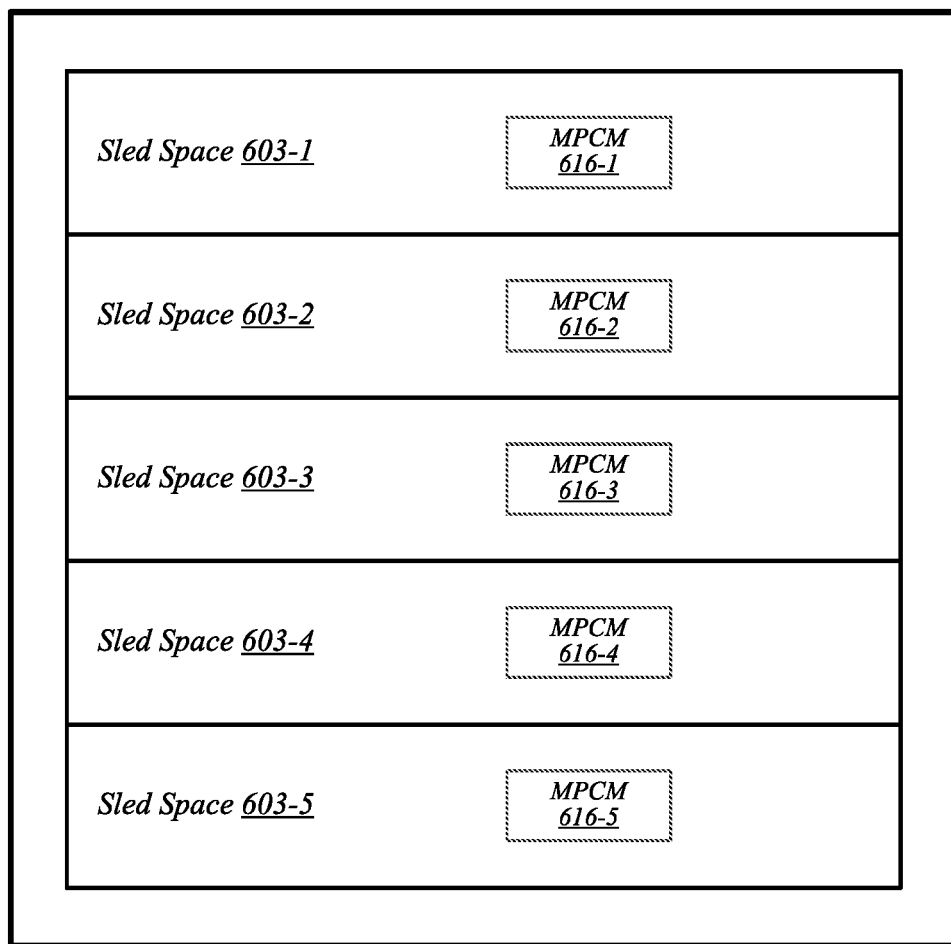
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
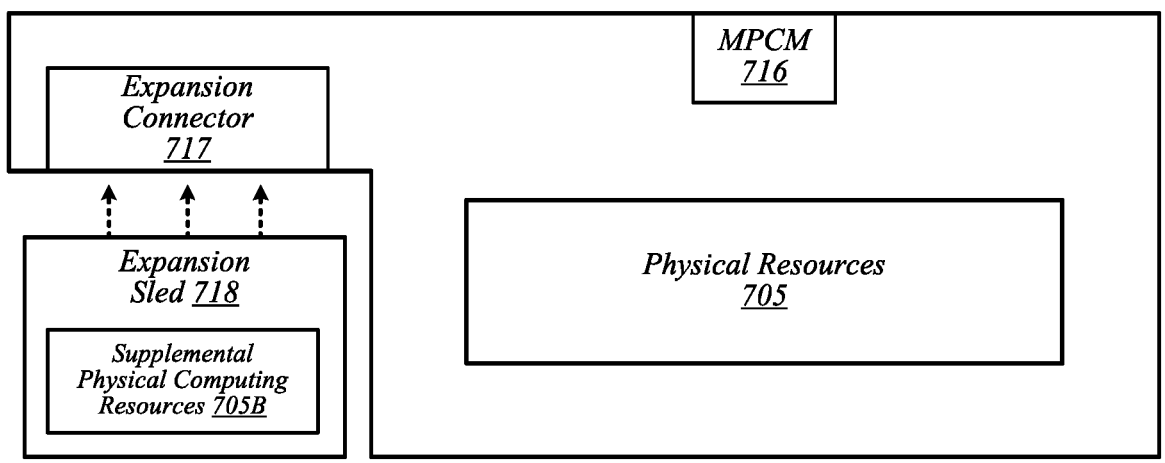
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
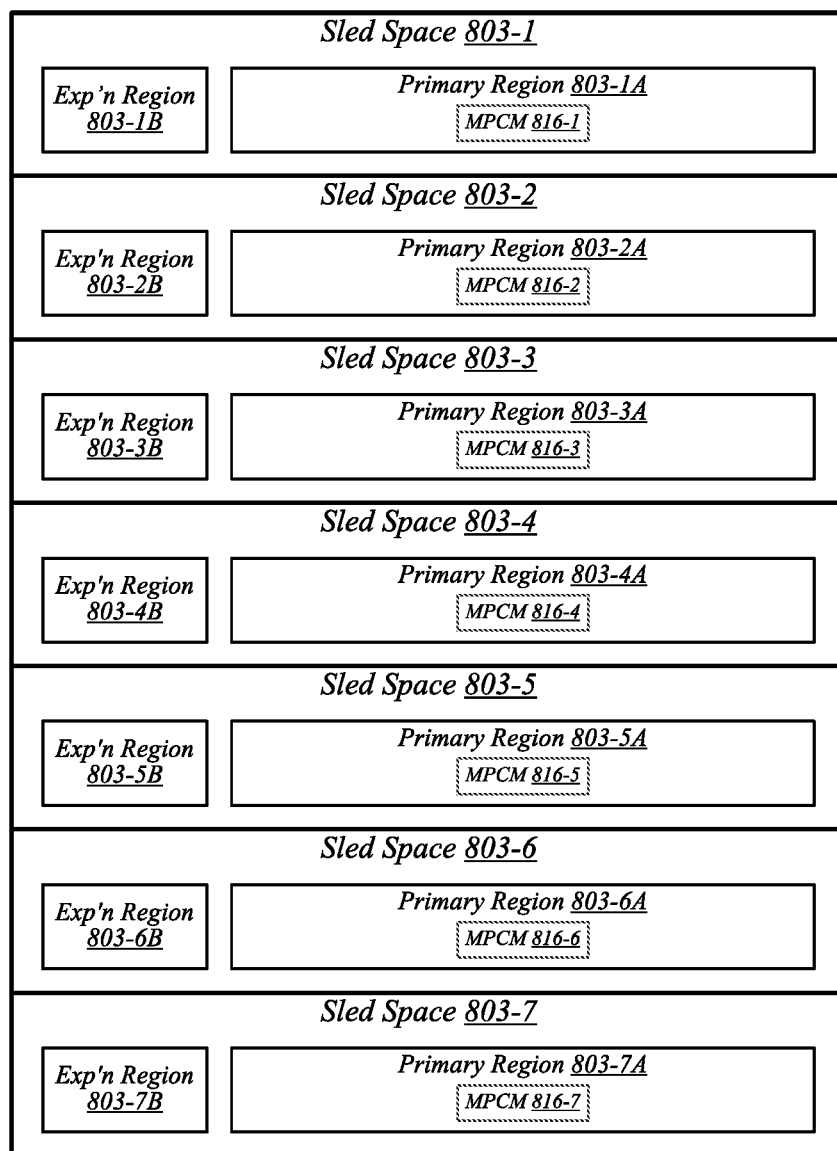
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
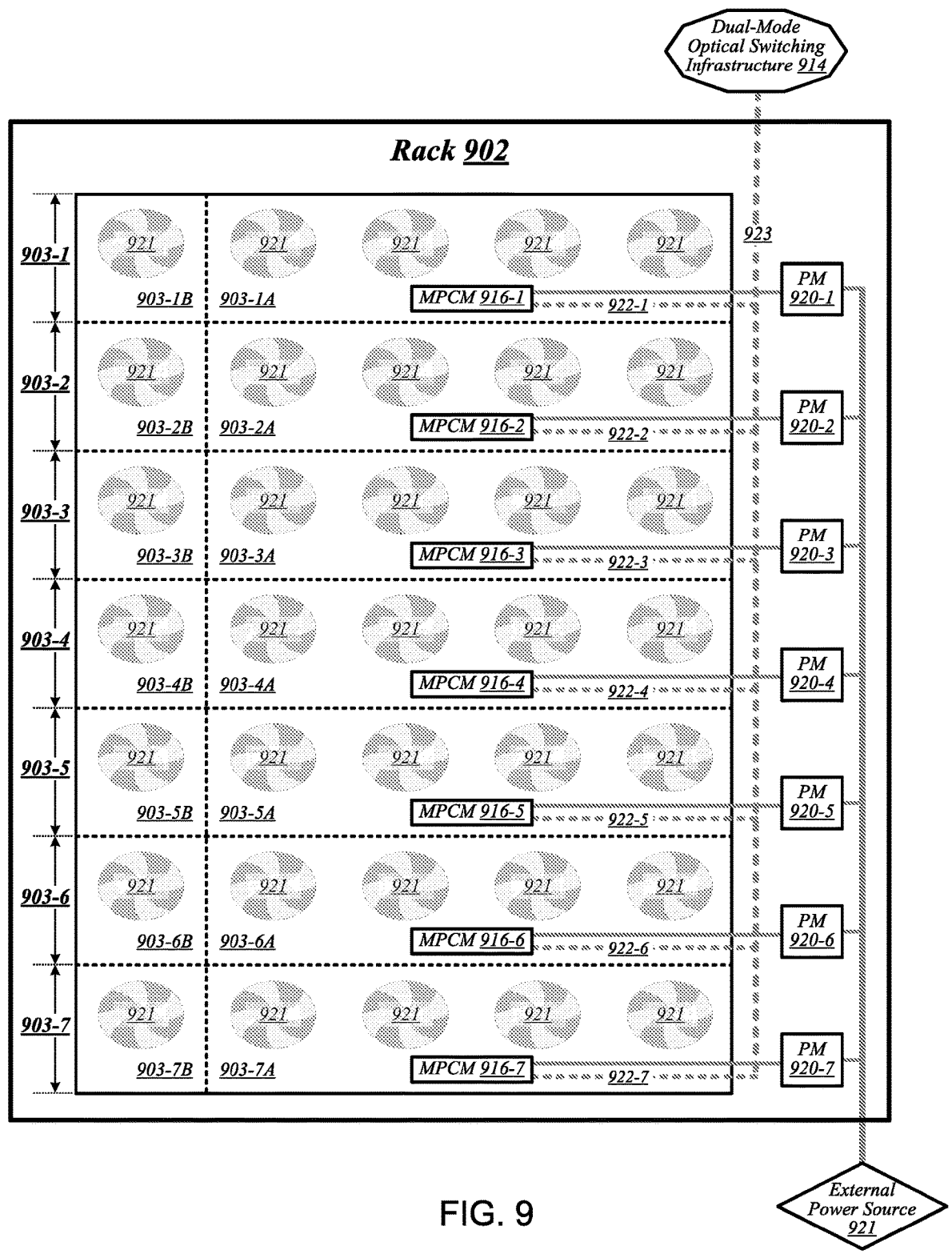
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
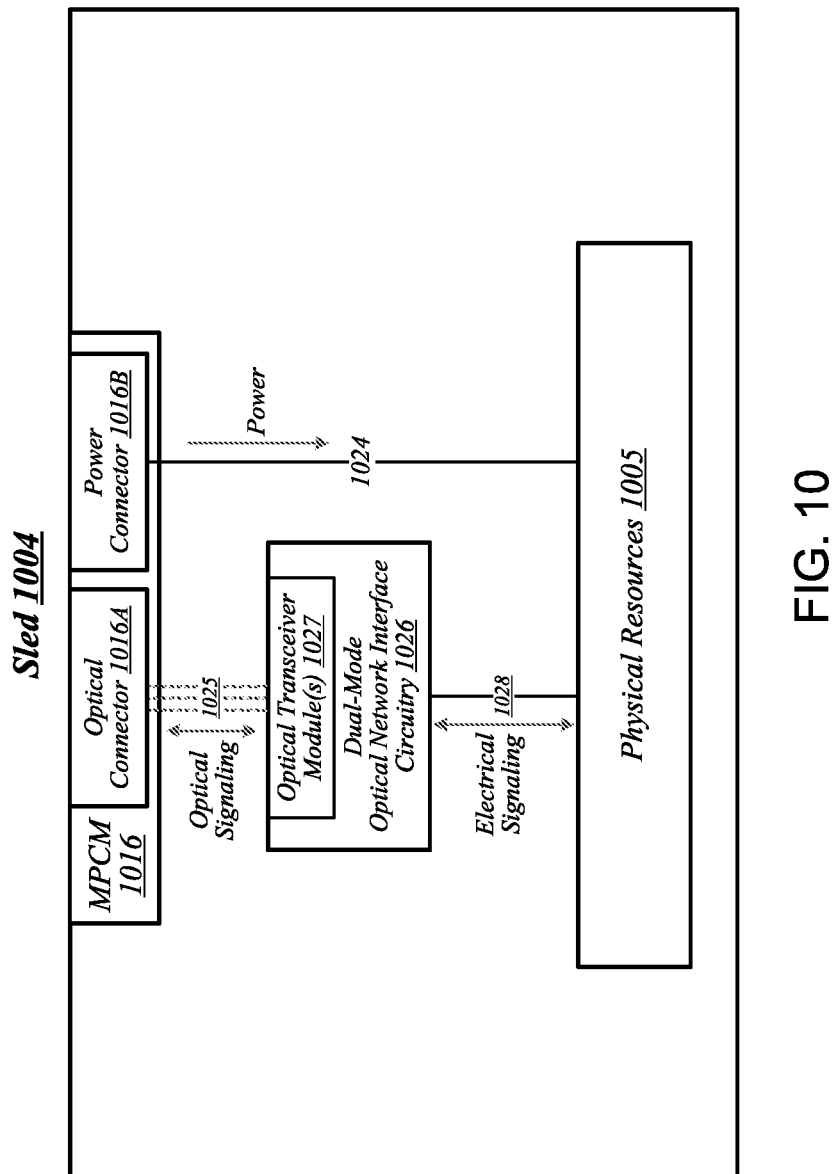
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
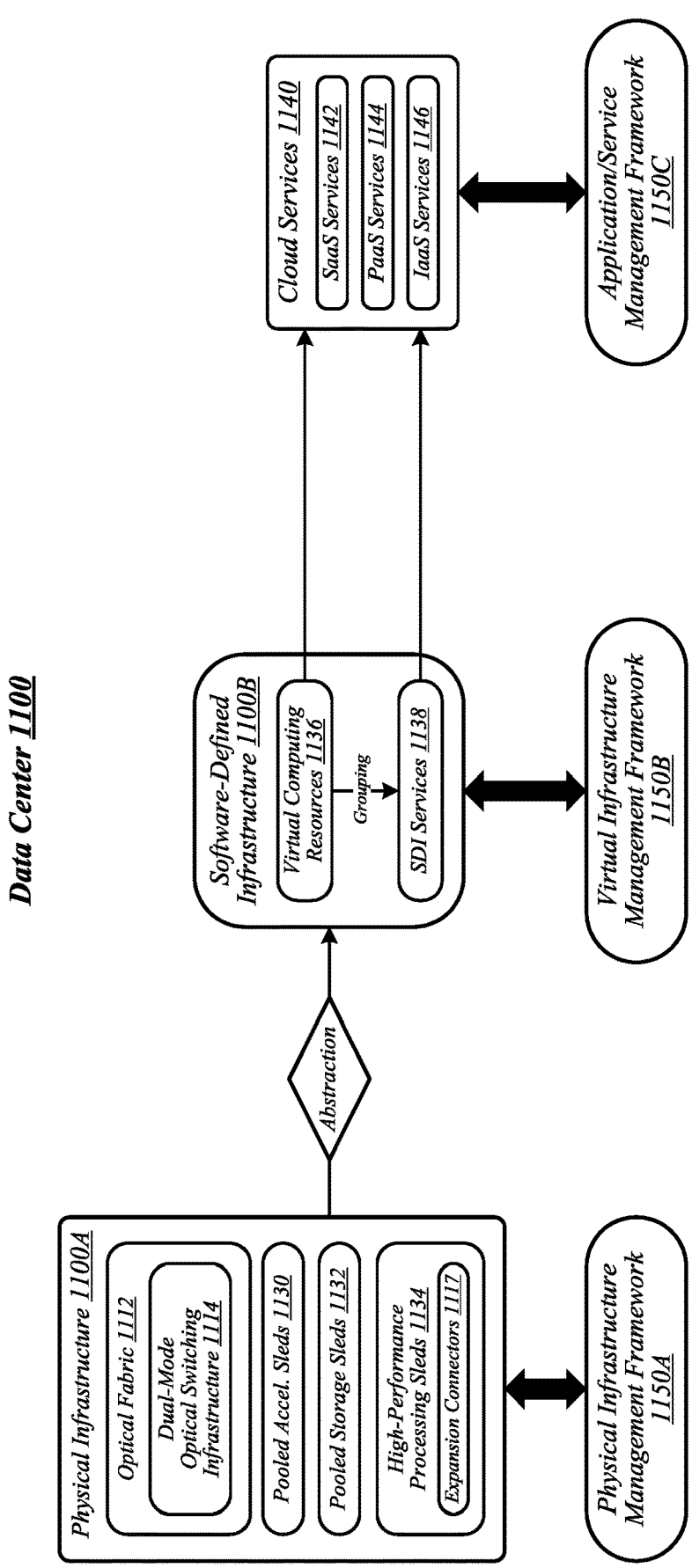
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
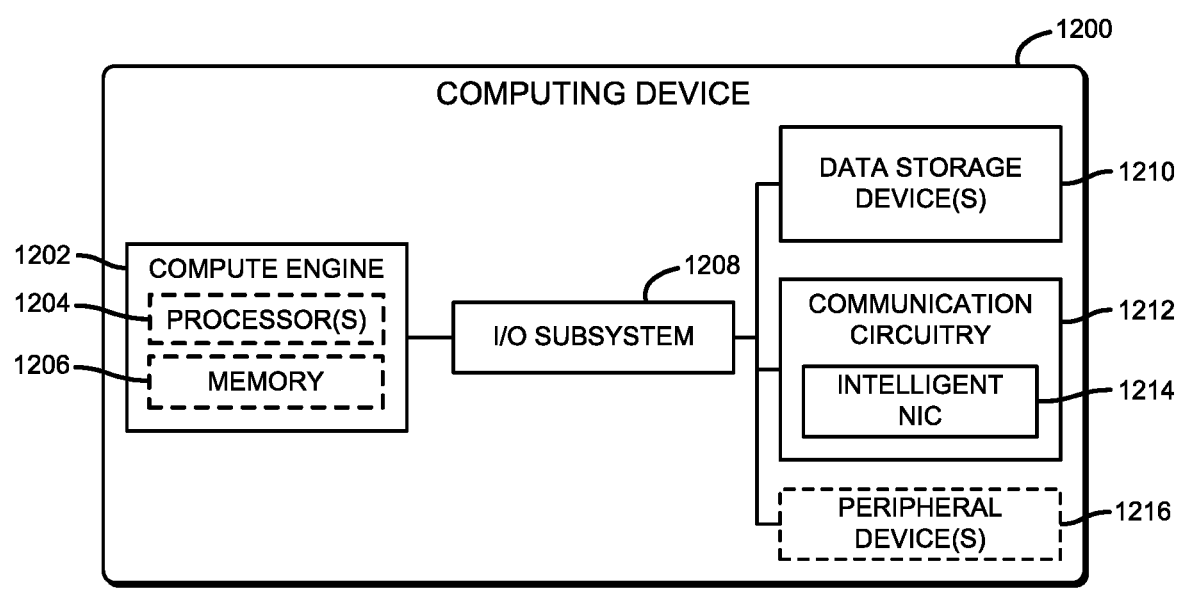
FIG. 12 is a simplified block diagram of at least one embodiment of a computing device for processing network packets by an intelligent network interface controller (NIC) of the computing device.

Referring now to FIG. 12, an illustrative computing device 1200 for processing network packets by an intelligent network interface controller (NIC) (e.g., the NIC 1214 of the communication circuitry 1212) includes, among other components, a compute engine 1202, a data storage device 1210, and communication circuitry 1212. The computing device 1200 may be embodied as a server (e.g., a stand-alone server, a rack server, a blade server, etc.), a compute node, a storage node, a switch (e.g., a disaggregated switch, a rack-mounted switch, a standalone switch, a fully managed switch, a partially managed switch, a full-duplex switch, and/or a half-duplex communication mode enabled switch), a router, and/or a sled in a data center (e.g., one of the sleds 204, 404, 504, 1004, 1130, 1132, 1134), any of which may be embodied as one or more physical and/or virtual devices.

In use, as described in further detail below, the intelligent NIC 1214 of the computing device 1200 receives a network packet (e.g., at one of the network interfaces 1302 of the intelligent NIC 1214 of FIGS. 13 and 14) from another computing device (not shown). The other computing device may be embodied as any type of computing device, such as a mobile computing device (e.g., a smartphone, a laptop/tablet computing device, a wearable computing device, etc.), a desktop computing device, an internet of things (IoT) device, a server (e.g., stand-alone, rack-mounted, blade, etc.), a switch (e.g., a disaggregated switch, a rack-mounted switch, a standalone switch, a fully managed switch, a partially managed switch, a full-duplex switch, and/or a half-duplex communication mode enabled switch), a router, a network appliance, a web appliance, a distributed computing system, a processor-based system, and/or a multiprocessor system, any of which may be embodied as one or more physical and/or virtual devices. In an illustrative embodiment, the source computing device may be embodied as another server sled, such as one of the sleds 204, 404, 504, 1004, 1130, 1132, 1134 described above.

Upon receiving the network packet, a network interface (e.g., the network interface 1302 of FIGS. 13 and 14) of the intelligent NIC 1214 is configured to write the contents of the received network packet (e.g., the header(s), payload, footer(s), etc.) in a distributed fashion to a memory fabric (e.g., the memory fabric 1304 of FIGS. 13 and 14) of the intelligent NIC 1214. Accordingly, it should be appreciated that the memory fabric 1304 includes multiple memory storage components (not shown) referred to herein as segments, each of which are usable to support the storage of the contents of the received network packet. The network interface 1302 is additionally configured to, subsequent to having written the contents of the received network packet to the memory fabric, transmit an event message to a packet processor, illustratively shown as the flexible packet processor (FXP) 1306 of the intelligent NIC 1214 in FIGS. 13 and 14, indicating the network packet has been received.

Upon having received the event message, the FXP 1306 can identify a packet flow associated with the received network packet or determine whether one or more operations are to be performed on the received network packet. To identify the associated for or determine whether an operation is to be performed, the FXP 1306 is configured to read at least a portion of the network packet from the corresponding location(s) of the memory fabric 1304 in which the relevant portion(s) have been written to. If the associated packet flow cannot be identified (e.g., the received packet is the first network packet of a packet flow) or the FXP 1306 has determined that at least one operation is to be performed on the received network packet (e.g., such as me be determinable based on a usage model associated with a type of the network packet received), the FXP 1306 is configured to generate and transmit a message to a controller device of the intelligent NIC 1214, illustratively shown as the bare metal controller 1314 of FIGS. 13 and 14.

Upon receipt of the message, the bare metal controller 1314 is configured to identify a subsequent action to be undertaken based on the type of message received. The type of message generated may depend on the action to be undertaken (e.g., identify the packet flow, perform an operation, etc.). For example, the message may be a host identifier request message usable to by the bare metal controller 1314 to indicate that the packet flow associated with the received network packet is to be identified such that a corresponding host interface (e.g., one of the host interfaces 1312 of FIGS. 13 and 14) can be determined therefrom. In another example, the message may be a network packet received message usable by the bare metal controller 1314 to indicate that one or more operations (e.g., accelerator operations) are to be performed on the received network packet.

Figure 19:
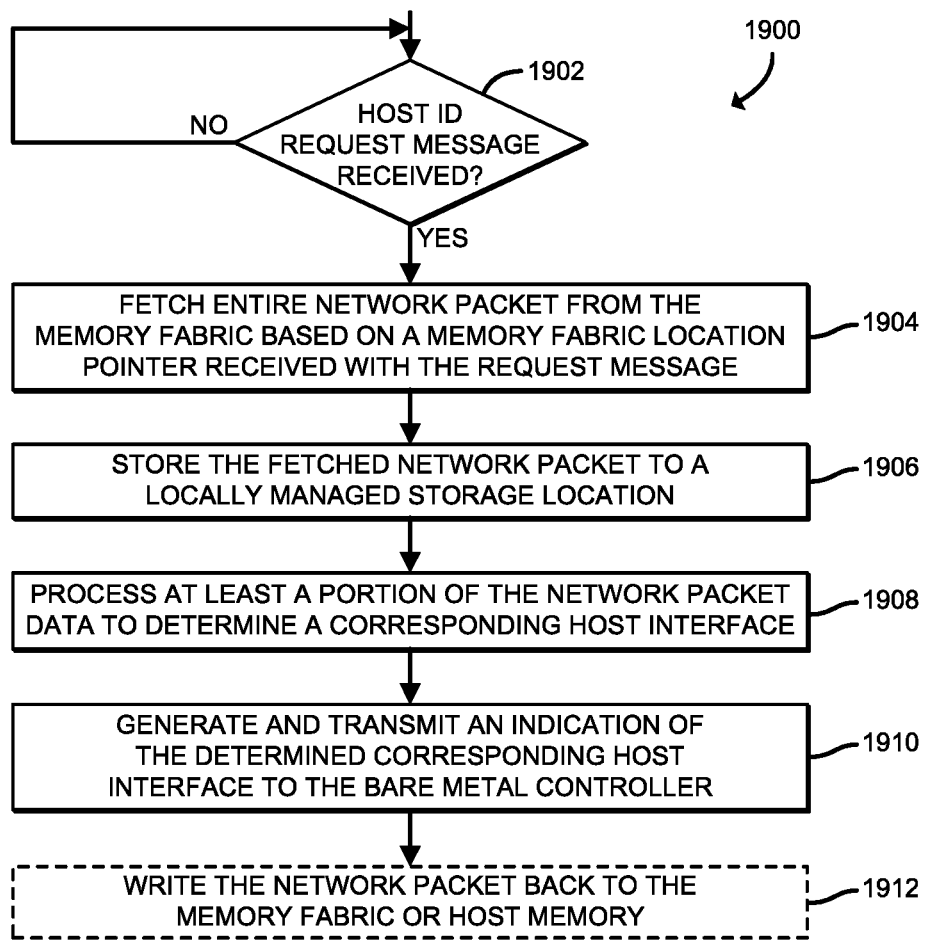
FIG. 19 is a simplified flow diagram of at least one embodiment of a method for identifying a host interface associated with a received network packet that may be performed by an on-die core of the intelligent NIC of FIGS. 13 and 14.

If the received message is a host identifier request message, the bare metal controller 1314 is configured to forward the message to the on-die cores (e.g., one of the on-die cores 1318 of FIGS. 13 and 14), such that one or more of the on-die cores 1318 can perform the necessary steps to identify the packet flow and the corresponding one of the host interfaces 1312 (see, e.g., the method 1900 for identifying a host interface associated with the first network packet of a packet flow of FIG. 19). Alternatively, if the received message is a network packet received message, the bare metal controller 1314 is configured to read at least a portion of the received network packet, overwrite the read portion with a software triggered action, manipulate a header of the network packet to create a reserved region, and transmit an operation request (e.g., an acceleration request) to the on-die cores, such that one or more of the on-die cores can perform the necessary steps to perform the operation (e.g., coordinate an acceleration operation with one of the accelerator agents 1308 of FIGS. 13 and 14.

The software triggered action may include any indication as to how to restructure a network packet upon completion of the operation(s) performed thereon by the on-die cores 1318. For example, a software triggered action may indicate to the bare metal controller 1314 to add bytes to the structure of the header for a header encap or the addition of network packet metadata, remove bytes from the structured of the header for a header decap or the removal of existing network packet metadata, change a starting position of a network packet pointer, etc. It should be appreciated that the bare metal controller 1314 may be configured, in other embodiments, to receive other message types usable to perform other subsequent actions upon receipt.

As illustratively shown in FIG. 12, the computing device 1200 includes a compute engine 1202, an input/output (I/O) subsystem 1208, one or more data storage devices 1210, communication circuitry 1212, and, in some embodiments, one or more peripheral devices 1216. Of course, in other embodiments, the computing device 1200 may include other or additional components, such as those commonly found in a computing device (e.g., a power supply, cooling component(s), a graphics processing unit (GPU), etc.). Additionally, in some embodiments, one or more of the illustrative components may be incorporated in, or otherwise form a portion of, another component.

The compute engine 1202 may be embodied as any type of device or collection of devices capable of performing various compute functions described below. In some embodiments, the compute engine 1202 may be embodied as a single device such as an integrated circuit, an embedded system, an FPGA, a system-on-a-chip (SoC), or other integrated system or device. Additionally, in some embodiments, the compute engine 1202 includes or may otherwise be embodied as a processor 1204 and a memory 1206. The processor 1204 may be embodied as any type of processor capable of performing the functions described herein. For example, the processor 1204 may be embodied as one or more single or multi-core processors, a microcontroller, or other processor or processing/controlling circuit. In some embodiments, the processor 1204 may be embodied as, include, or otherwise be coupled to an FPGA, an application specific integrated circuit (ASIC), reconfigurable hardware or hardware circuitry, or other specialized hardware to facilitate performance of the functions described herein.

The memory 1206 may be embodied as any type of volatile (e.g., dynamic random access memory (DRAM), etc.) or non-volatile memory or data storage capable of performing the functions described herein. It should be appreciated that the memory 1206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1206 may be integrated into the processor 1204. In operation, the memory 1206 may store various software and data used during operation such as job request data, kernel map data, telemetry data, applications, programs, libraries, and drivers.

The compute engine 1202 is communicatively coupled to other components of the computing device 1200 via the I/O subsystem 1208, which may be embodied as circuitry and/or components to facilitate input/output operations with the compute engine 1202 (e.g., with the processor 1204 and/or the memory 1206) and other components of the computing device 1200. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1208 may form a portion of a SoC and be incorporated, along with one or more of the processor 1204, the memory 1206, and other components of the computing device 1200, into the compute engine 1202.

The one or more data storage devices 1210 may be embodied as any type of devices configured for short-term or long-term storage of data such as, for example, memory devices and circuits, memory cards, hard disk drives, solid-state drives, or other data storage devices. Each data storage device 1210 may include a system partition that stores data and firmware code for the data storage device 1210. Additionally, each data storage device 1210 may also include an operating system partition that stores data files and executables for an operating system.

The communication circuitry 1212 may be embodied as any communication circuit, device, or collection thereof, capable of enabling network communications between the computing device 1200 and another computing device (e.g., a source computing device) over a network (not shown).

Such a network may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Accordingly, the communication circuitry 1212 may be configured to use any one or more communication technology (e.g., wired or wireless communications) and associated protocols (e.g., Ethernet, Bluetooth®, Wi-Fi®, WiMAX, etc.) to effect such communication. As noted previously, the illustrative communication circuitry 1212 includes the intelligent NIC 1214, which may also be referred to as a smart NIC or an intelligent/smart host fabric interface (HFI), and is described in further detail in FIGS. 13 and 14. The intelligent NIC 1214 may be embodied as one or more add-in-boards, daughter cards, network interface cards, controller chips, chipsets, or other devices that may be used by the computing device 1200 to transmit/receive network communications to/from another computing device.

The peripheral device(s) 1216 may include any type of device that is usable to input information into the computing device 1200 and/or receive information from the computing device 1200. The peripheral devices 1216 may be embodied as any auxiliary device usable to input information into the computing device 1200, such as a keyboard, a mouse, a microphone, a barcode reader, an image scanner, etc., or output information from the computing device 1200, such as a display, a speaker, graphics circuitry, a printer, a projector, etc. It should be appreciated that, in some embodiments, one or more of the peripheral devices 1216 may function as both an input device and an output device (e.g., a touchscreen display, a digitizer on top of a display screen, etc.). It should be further appreciated that the types of peripheral devices 1216 connected to the computing device 1200 may depend on, for example, the type and/or intended use of the computing device 1200. Additionally or alternatively, in some embodiments, the peripheral devices 1216 may include one or more ports, such as a USB port, for example, for connecting external peripheral devices to the computing device 1200.

Figure 13:
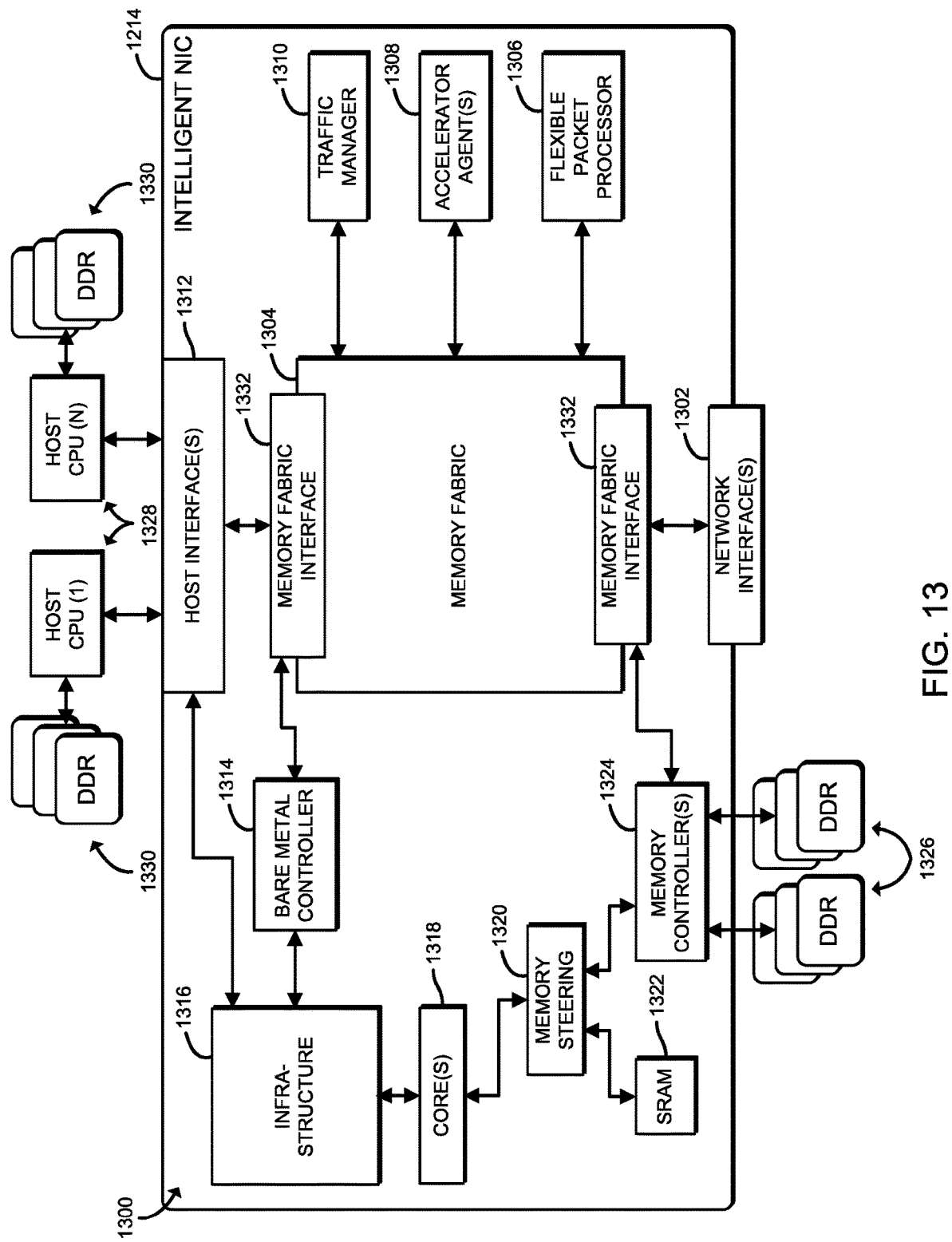
FIG. 13 is a simplified block diagram of at least one embodiment of an environment that may be established by the intelligent NIC of FIG. 12.

Referring now to FIG. 13, the NIC 1214 of the computing device 1200 of FIG. 12 may establish an environment 1300 during operation. The illustrative environment 1300 includes the one or more network interfaces 1302, the memory fabric 1304, the FXP 1306, the one or more accelerator agents 1308, a traffic manager 1310, the one or more host interfaces 1312, the bare metal controller 1314, one or more on-die processing cores 1318, an infrastructure 1316, a memory steering unit 1320, an SRAM 1322, and one or more memory controllers 1324. The various components of the environment 1300 may be embodied as hardware, firmware, software, or a combination thereof. As such, in some embodiments, one or more of the components of the environment 1300 may be embodied as circuitry or collection of electrical devices. Additionally, in some embodiments, one or more of the illustrative components may form a portion of another component and/or one or more of the illustrative components may be independent of one another.

The network interface(s) 1302 are configured to receive inbound network traffic and route/transmit outbound network traffic. To facilitate the receipt of inbound and transmission of outbound network communications (e.g., network traffic, network packets, network packet flows, etc.)

to/from the computing device 1200, the network interfaces 1302 are configured to manage (e.g., create, modify, delete, etc.) connections to physical and virtual network ports (i.e., virtual network interfaces) of the intelligent NIC 1214, as well as the ingress/egress buffers/queues associated therewith. The network interfaces 1302 are additionally configured to coordinate with the memory fabric interface 1332 to store the contents (e.g., header(s), payload, footer(s), etc.) of network packets received at the network interfaces 1302 to the memory fabric 1304.

As noted previously, the memory fabric 1304 includes a segments (not shown) usable to store the contents of the received network packets. Accordingly, it should be appreciated that the memory fabric interface 1332 is configured to manage the data writes to the segments in a distributed fashion and provide an indication (e.g., a pointer) usable to identify the storage locations of the segments in which the contents of the network packets has been stored. Additionally, the memory fabric interface 1332 is configured to notify the FXP 1306 when a received network packet has been stored in the memory fabric 1304 and provide the memory fabric location pointer(s) to the FXP 1306.

The FXP 1306 is configured to identify a packet flow associated with the received network packet and determine whether to notify the host interface corresponding to the packet flow. To identify the packet flow, the FXP 1306 may perform a lookup on a table that indicates which packet flows correspond to which of the host interfaces 1312. If the lookup fails (e.g., the associated packet flow is not in the lookup table), the FXP 1306 is configured to generate an transmit a message (i.e., a host identifier request message) to the bare metal controller 1314, which is usable by the bare metal controller 1314 to take subsequent action to identify the associated packet flow and corresponding host interface 1312. In some embodiments, the FXP 1306 may be additionally configured to generate and transmit a message (i.e., a network packet received message) to the bare metal controller 1314 upon receipt of each network packet such that an operation may be performed prior to notifying the appropriate host interface 1312 of the network packet's receipt.

The accelerator agents 1308 are each configured to perform an acceleration operation on at least a portion of the network packet. For example, such accelerator agents 1308 may include a remote direct memory access (RDMA) operation, a cryptography operation, or any other type of acceleration. The traffic manager 1310 is configured to perform traffic-management in the packet-processing data path, such as may be performed to enforce service-level agreements (SLAs).

Each of the host interfaces 1312 is configured to function as an interface between a respective one of the host CPUs 1328 (e.g., one of the processors 1204 of the compute engine 1202 of FIG. 12) and the intelligent NIC 1214. For example, the host interfaces 1312 are configured to function as an interface between the host CPUs 1328 (e.g., the processor 1204 of the compute engine 1202 of FIG. 12) and the memory fabric 1304 (e.g., via the memory fabric interface 1332), as well as an interface between the host CPUs 1328 and the infrastructure 1316. Accordingly, messages and/or network packet data may be passed therebetween via one or more communication links, such as PCIe interconnects, to provide access to the host memory 1330 (e.g., the memory 1206 of the compute engine 1202 of FIG. 12).

The bare metal controller 1314 may be embodied as any type of virtual or physical controller device capable of performing the functions described herein. The bare metal controller 1314 is configured to receive messages from the FXP 1306 identify a subsequent action to be undertaken based on the type of message received. For example, as described previously, if the received message is a network packet received message, the bare metal controller 1314 is configured to read at least a portion of the received network packet, overwrite the read portion with a software triggered action, manipulate a header of the network packet to create a reserved region, and transmit an operation request (e.g., an acceleration request) to the on-die cores 1318, such that one or more of the on-die cores 1318 can perform the necessary steps to perform the operation (e.g., coordinate an acceleration operation with one of the accelerator agents 1308). It should be appreciated that, in some embodiments, the bare metal controller 1314 may be incorporated into another component. For example, referring now to FIG. 14, the NIC 1214 of the computing device 1200 of FIG. 12 may establish an environment 1400 during operation in which the bare metal controller 1314 is integrated with the host interfaces 1312. It should be further appreciated that, in some embodiments, the bare metal controller 1314 may be a physical or virtual component.

Referring back to FIG. 13, the one or more on-die cores 1318 are configured to perform computations local to the intelligent NIC 1214. Accordingly, the on-die cores 1318 can provide computational power to perform certain operations without the data being operated on having to be moved to a location remote of the intelligent NIC 1214, thereby eliminating the latency otherwise introduced by moving the data. The infrastructure 1316 may include various components to manage the communications, state, and controls of the on-die cores 1318 and/or the host interface 1312, such as a serial communication interface (e.g., a universal asynchronous receiver and transmitter (UART), a serial peripheral interface (SPI) bus, etc.), a testing/debugging interface, a digital thermal sensor, I/O controllers, etc.

The SRAM 1322 is communicatively coupled to the on-die cores 1318 via a memory steering unit 1320 and may be used to store data (e.g., work queues, notifications, interrupts, headers, descriptors, critical structures, etc.) for the on-die cores 1318. Additionally, the memory steering unit 1320 is also coupled to one or more memory controllers 1324. The memory controllers 1324 may be double data rate (DDR) memory controllers configured to drive DDR SDRAM 1326 external to, but managed by the intelligent NIC 1214, rather than the host CPUs (e.g., the processor(s) 1204 of the compute engine 1202 of FIG. 12). Accordingly, accesses to the DDR SDRAM 1326 are faster relative to accesses to the DDR SDRAM 1330 (i.e., host memory) of the host CPUs 1328. The memory controllers 1324 are additionally communicatively coupled to the memory fabric 1304 via the memory fabric interface 1332, such that data stored in the DDR SDRAM 1326 can be transferred to/from the memory fabric 1304.

Figure 15:
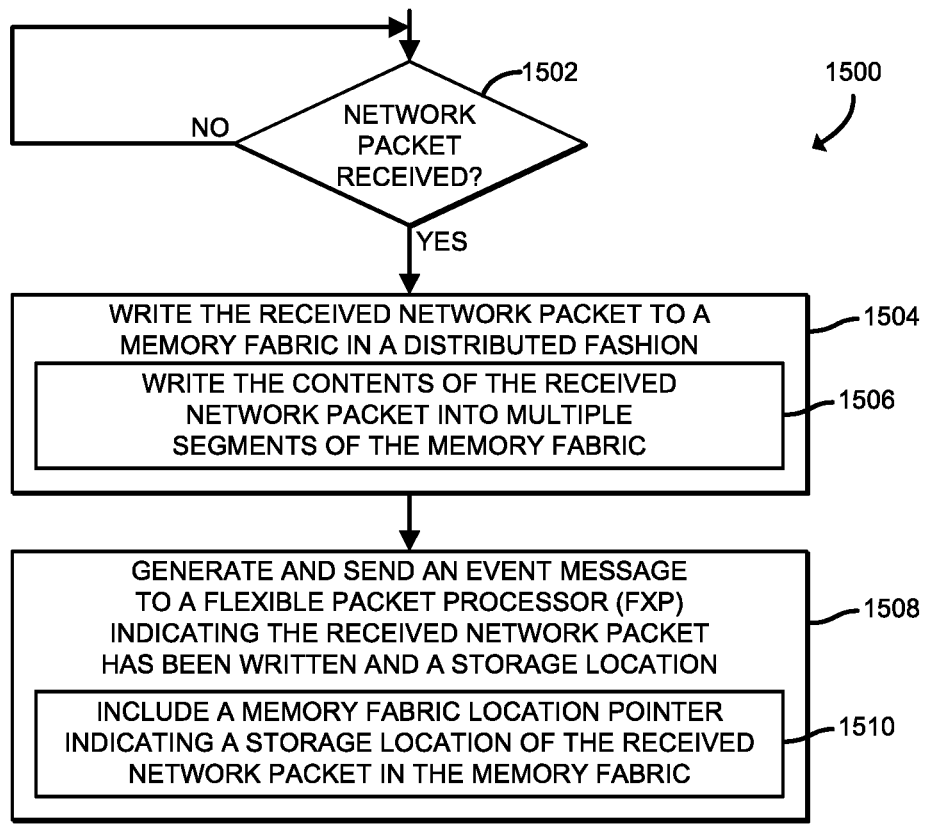
FIG. 15 is a simplified flow diagram of at least one embodiment of a method for generating an event message in response to receiving a network packet that may be performed by a network interface of the intelligent NIC of FIGS. 12-14.

Referring now to FIG. 15, in use, the computing device 1200, or more particularly the intelligent NIC 1214 of the computing device 1200, may execute a method 1500 for generating an event message in response to receiving a network packet. The method 1500 begins in block 1502, in which the intelligent NIC 1214, or more particularly a network interface 1302 of the intelligent NIC 1214, determines whether a network packet has been received. If so, the method 1500 advances to block 1504, in which the intelligent NIC 1214, or more particularly the memory fabric interface 1332 of the intelligent NIC 1214, writes the received network packet to a memory fabric (e.g., the memory fabric 1304 of FIG. 13) of the intelligent NIC 1214 in a distributed fashion.

To do so, in block 1506, the memory fabric interface 1332 allocates multiple segments of the memory fabric 1304 and writes the contents (e.g., the header(s), payload, and footer(s)) of the received network packet into the allocated segments. In block 1508, the memory fabric interface 1332 generates and sends an event message to the FXP (e.g., the FXP 1306 of FIG. 13) indicating the received network packet has been received. Additionally, in block 1510, the memory fabric interface 1332 includes a memory fabric location pointer with the event message which is usable to identify the memory locations in which the received network packet has been written to.

Figure 16:
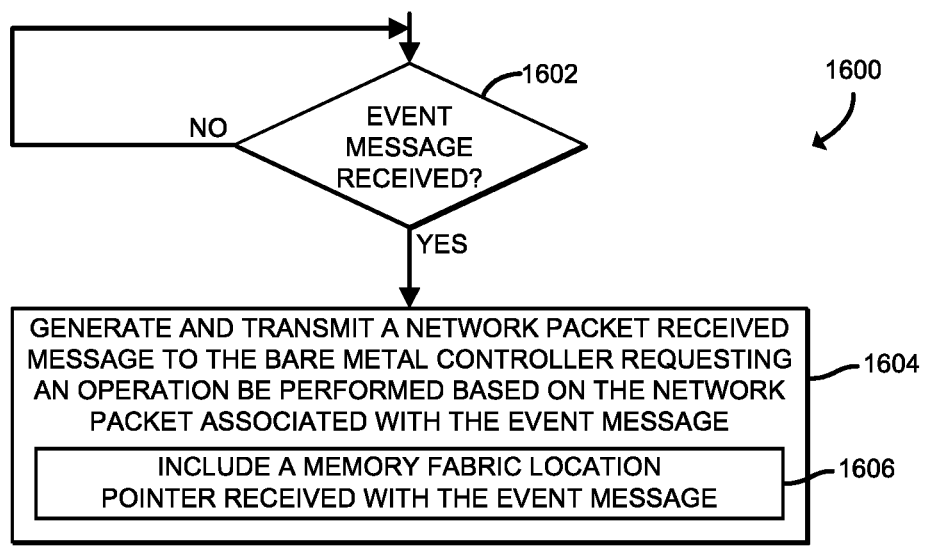
FIG. 16 is a simplified flow diagram of at least one embodiment of a method for generating a network packet received message in response to receiving an event message that may be performed by a packet processor of the intelligent NIC of FIGS. 13 and 14.
Figure 17:
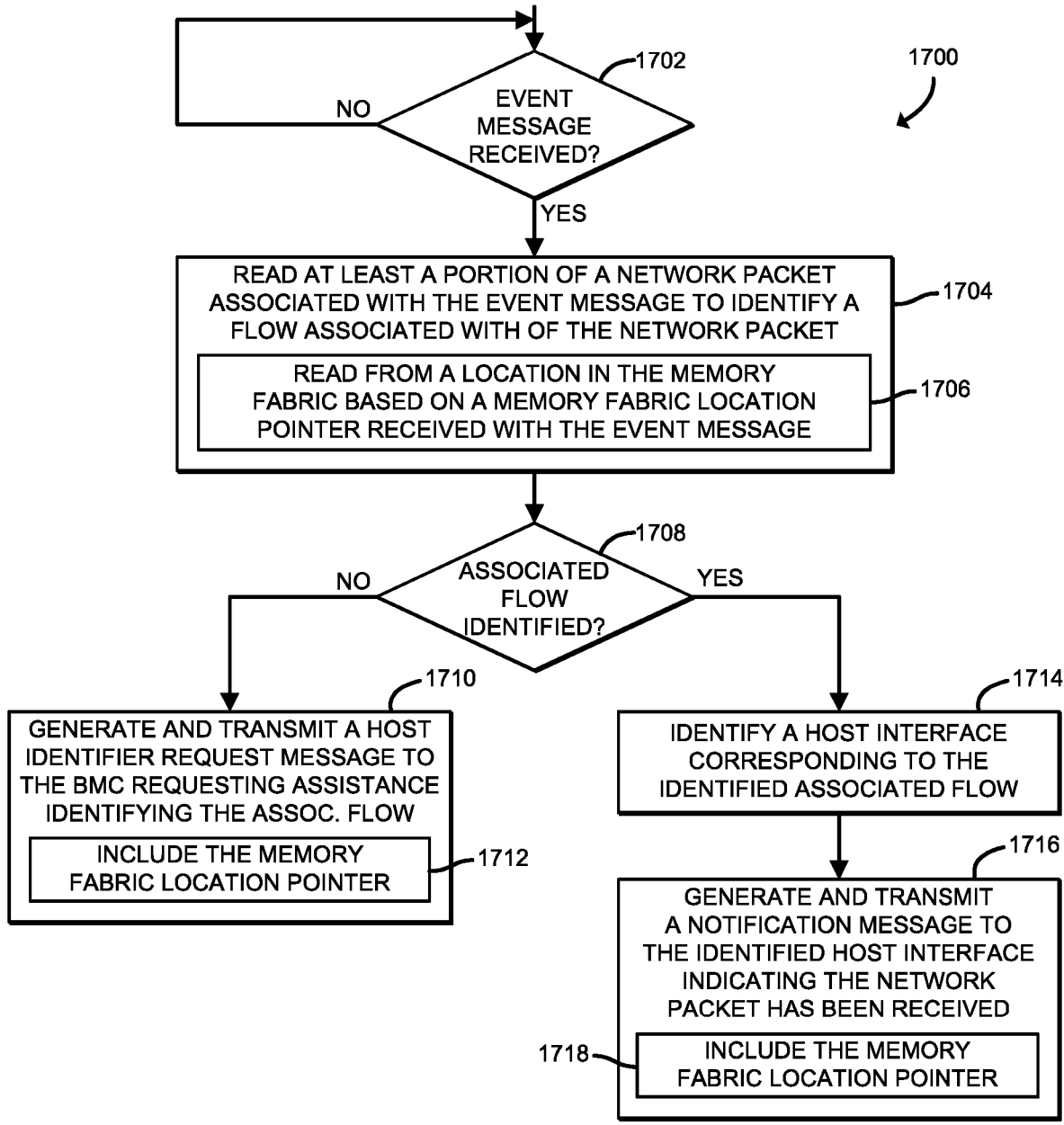
FIG. 17 is a simplified flow diagram of at least one embodiment of a method for associating a flow with a received network packet in response to receiving an event message that may be performed by a packet processor of the intelligent NIC of FIGS. 13 and 14.

FIGS. 16 and 17 illustratively show two examples of methods that may be performed by the FXP 1306 upon receipt of an event message. For example, in the method 1600 of FIG. 16, the FXP 1306 may be configured to notify the bare metal controller 1314 for every received event message that indicates a network packet has been received. Alternatively, in the method 1700 of FIG. 17, the FXP 1306 may be configured to first identify a packet flow associated with the network packet corresponding to each received event message, prior to either notifying the bare metal controller 1314 or a corresponding one of the host interfaces 1312 of the received network packet. It should be appreciated that, in some embodiments, the FXP 1306 may be configured to perform one or more additional operations on at least a portion of the network packet in addition or alternative to those described herein, such as upon receipt of the event message, after additional operations have been performed on the network packet (e.g., by an on-die core 1318, an agent 1308, etc.), etc. For example, in some embodiments, the FXP 1306 may be configured to create a reserved region in the header of the network packet having a predetermined size, such as by shifting the header. In such embodiments, the FXP 1306 may create a reserved region sufficient in size to encapsulate another header in the network packet header, add a particular amount of metadata to the network packet header, etc. Additionally, in such embodiments, the FXP 1306 may be configured to compress out any unused portion of the reserved region upon completion of operation(s) to be performed thereon. In other words, the FXP 1306 may be additionally configured to perform operations that might otherwise be performed on by the on-die cores 1318 and/or the bare metal controller 1314.

Referring now to FIG. 16, in use, the computing device 1200, or more particularly the intelligent NIC 1214 of the computing device 1200, may execute a method 1600 for generating a network packet received message in response to receiving an event message. The method 1600 begins in block 1602, in which the intelligent NIC 1214, or more particularly an FXP (e.g., the FXP 1306) of the intelligent NIC 1214, determines whether an event message has been received from the memory fabric interface 1332 (e.g., in response to having received the network packet associated with the event message). It should be appreciated that the event message includes a memory fabric location pointer usable to identify the memory locations in which the received network packet has been written in the memory fabric 1304.

If the FXP 1306 determines that the event message has been received, the method 1600 advances to block 1604, in which the FXP 1306 generates and transmits a network packet received message to a bare metal controller (e.g., the bare metal controller 1314) requesting an operation be performed. In some embodiments, the FXP 1306 may be configured to generate and transmit the network packet received message in response to every received network packet. Alternatively, in other embodiments, the FXP 1306 may be configured to identify one or more characteristics of the received network packet (e.g., a packet flow, a source identifier, a destination identifier, etc.) and determine whether to generate and transmit the network packet received message as a function of the one or more identified characteristics. Additionally, in block 1606, the FXP 1306 includes a memory fabric location pointer with the network packet received message.

Referring now to FIG. 17, in use, the computing device 1200, or more particularly the intelligent NIC 1214 of the computing device 1200, may execute a method 1700 for associating a packet flow with a received network packet in response to receiving an event message. The method 1700 begins in block 1702, in which the intelligent NIC 1214, or more particularly an FXP (e.g., the FXP 1306) of the intelligent NIC 1214, determines whether an event message has been received. If so, the method 1700 advances to block 1704, in which the FXP 1306 reads at least a portion of the network packet (e.g., at least a portion of the header(s), the payload, and/or the footer(s)) associated with the received event message to identify a packet flow of the network packet. To do so, in block 1706, the FXP 1306 reads at least the portion of the network packet from a segment located in the memory fabric 1304, the segment location having been determined based on a memory fabric location pointer received with the event message.

In block 1708, the FXP 1306 determines whether an associated packet flow has been identified. To do so, for example, the FXP 1306 may be configured to perform a lookup on a table that indicates which packet flows correspond to one or more characteristics of the received network packet (e.g., a data type, a source identifier, a destination identifier, etc.). If the FXP 1306 determines that an associated packet flow has not been identified (e.g., the network packet associated with the event message is the first network packet of the packet flow), the method 1700 branches to block 1710. In block 1710, the FXP 1306 generates and transmits a host identifier request message to the bare metal controller 1314 requesting assistance in identifying the packet flow, such that a corresponding host interface 1312 can be identified therefrom (see, e.g., the method 1900 of FIG. 19). Additionally, in block 1712, the FXP 1306 includes the memory fabric location pointer with the host identifier request message.

Otherwise, if the FXP 1306 determines that an associated packet flow has been identified, the method 1700 branches to block 1714. In block 1714, the FXP 1306 identifies a host interface corresponding to the identified associated packet flow. To do so, for example, the FXP 1306 may be configured to perform a lookup on a table that is usable to identify which packet flows correspond to which of the host interfaces 1312. In block 1716, the FXP 1306 generates and transmits a notification message to the identified host interface indicating the network packet has been received. Additionally, in block 1718, the FXP 1306 includes the memory fabric location pointer with the notification message.

Figure 18:
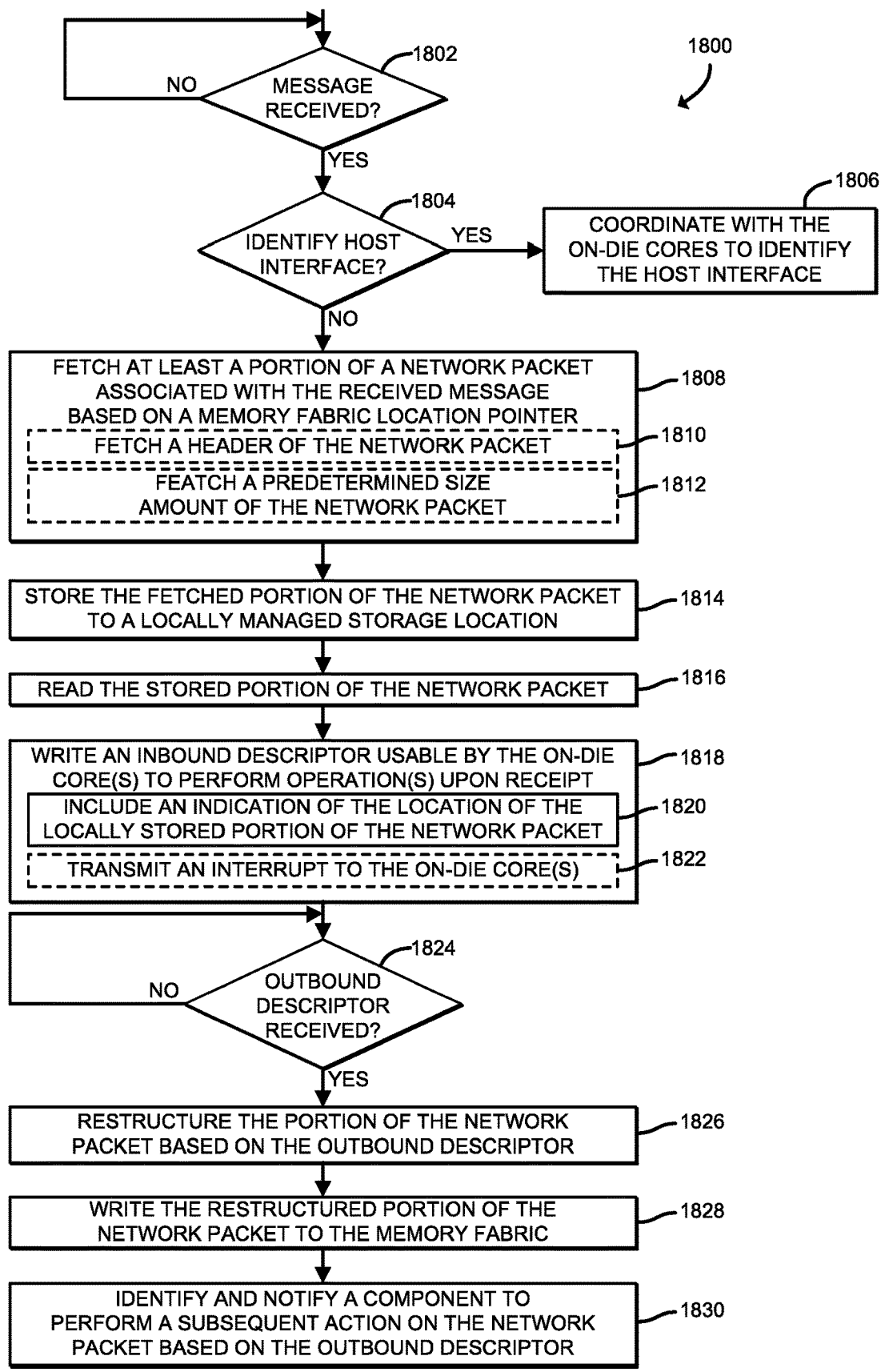
FIG. 18 is a simplified flow diagram of at least one embodiment of a method for facilitating an operation to be performed in response to having received a message that may be performed by a controller device of the intelligent NIC.

Referring now to FIG. 18, in use, the computing device 1200, or more particularly the intelligent NIC 1214 of the computing device 1200, may execute a method 1800 for facilitating an operation to be performed on a network packet in response to having received a message from the FXP 1306. The method 1800 begins in block 1802, in which the intelligent NIC 1214, or more particularly a bare metal controller (e.g., the bare metal controller 1314 of FIGS. 13 and 14) of the intelligent NIC 1214, determines whether a message has been received from the FXP 1306. If so, the method 1800 advances to block 1804, in which the bare metal controller 1314 determines whether to identify which host interface to notify the receipt of the network packet associated with the network packet received message. To do so, the bare metal controller 1314 is configured to determine the type of message received. For example, the received message may be a network packet received message (e.g., generated by the method 1600 of FIG. 16), a host identifier request message (e.g., generated by the method 1700 of FIG. 17), or other type of notification message (e.g., a statistic update notification, a scheduling request notification, a scheduling decision notification, etc.). Accordingly, it should be appreciated that certain portions of the method 1800 may not be performed upon receipt of another type of notification message (e.g., reading a portion of the network packet).

If the bare metal controller 1314 determines the corresponding host interface is to be identified (e.g., the received message corresponds to a host identifier request message), the method 1800 branches to block 1806, in which the bare metal controller 1314 coordinates with the on-die cores (e.g., the core(s) 1318 of FIG. 13) of the intelligent NIC 1214 to identify the host interface. For example, the bare metal controller 1314 may write an inbound descriptor usable by one or more of the on-die cores to indicate that the bare metal controller 1314 is requesting assistance in identifying the packet flow (see, e.g., the method 1900 of FIG. 19). Otherwise, if the bare metal controller 1314 determines the host interface (e.g., the received message corresponds to a network packet received message) does not need to be identified, the method 1800 branches to block 1808.

In block 1808, the bare metal controller 1314 fetches at least a portion of the network packet associated with the received message based on a corresponding memory fabric location pointer received with the message. To do so, in block 1810, in some embodiments the bare metal controller 1314 may fetch a header of the network packet. Alternatively, in block 1812, in other embodiments the bare metal controller 1314 may fetch a predetermined size amount of the network packet. In block 1814, the bare metal controller 1314 stores the fetched portion of the network packet to a locally managed storage location (e.g., the SRAM 1322, the DRAM 1326, etc.). In block 1816, the bare metal controller 1314 reads the stored portion of the network packet.

In block 1818, the bare metal controller 1314 writes an inbound descriptor (e.g., to a location in a locally managed storage) usable by the on-die cores 1318 to perform one or more operation(s) upon receipt of the inbound descriptor. Additionally, the bare metal controller 1314 includes an indication (e.g., a pointer) of the location of the locally stored portion of the network packet. In some embodiments, in block 1822, the bare metal controller 1314 may transmit an interrupt to the on-die cores 1318 to notify the on-die cores 1318 of the presence of the inbound descriptor.

In block 1824, the bare metal controller 1314 determines whether an outbound descriptor has been received from the on-die cores 1318. In other words, the on-die cores 1318 are configured to perform one or more operations on the portion of the network packet and, upon completion, write the outbound descriptor which informs the bare metal controller 1314 of the changes made by the on-die cores 1318 to the network packet (e.g., made the header larger or smaller, incorporated or removed metadata, etc.). The outbound descriptor may include any information usable to by the bare metal controller 1314 to identify where to fetch the updates portion of the network packet from the locally managed memory, what to do with the network packet (e.g., the next or final component to receive an event message associated with the network packet usable to identify an action to be performed upon receipt thereof), how the structure of the portion of the network packet changed, etc.

If the bare metal controller 1314 has received the outbound descriptor, the method advances to block 1826, in which the bare metal controller 1314 restructures the portion of the network packet based on the information contained within the outbound descriptor. For example, the bare metal controller 1314 may be configured to perform one or more hardware level protocol translations to restructure the portion of the network packet to account for the changes made to the portion of the network packet (e.g., the portion was made larger, the portion was made smaller, the portion includes updated information, etc.). In block 1828, the bare metal controller 1314 writes the restructured portion of the network packet to the memory fabric in a distributed fashion (e.g., via the memory fabric interface 1332 of FIG. 13). In block 1830, the bare metal controller 1314 identifies a subsequent action to be undertaken on the network packet (e.g., additional processing, transmission to another computing device, etc.) based on the information of the outbound descriptor and notifies a corresponding component (e.g., the FXP 1306, one of the accelerator agents 1306, one of the network interfaces 1302, etc.) via an event message.

Referring now to FIG. 19, in use, the computing device 1200, or more particularly the intelligent NIC 1214 of the computing device 1200, may execute a method 1900 for identifying a host interface associated with a received network packet. The method 1900 begins in block 1902, in which the intelligent NIC 1214, or more particularly one or more on-die cores (e.g., the on-die cores 1318 of FIGS. 13 and 14) of the intelligent NIC 1214, determines whether a message has been received from a bare metal controller (e.g., the bare metal controller 1314 of FIGS. 13 and 14) of the intelligent NIC 1214. If so, the method 1900 advances to block 1904, in which one of the on-die cores 1318 fetches the entire network packet from the memory fabric 1304 based on a memory fabric location pointer received with the host identification request message. In block 1906, the on-die core 1318 stores the contents of the network packet in a locally controlled memory (e.g., the DDR SDRAM 1326 of FIG. 13).

In block 1908, the on-die core 1318 processes at least a portion of the network packet data to determine a corresponding host interface. For example, the on-die core 1318 may analyze at least a portion of the header to determine a protocol, source identifier (e.g., a source IP address, a source port, etc.), destination identifier (e.g., destination IP address, destination port, etc.), and/or other network traffic characteristic, of the network packet. In another example, the on-die core 1318 may analyze at least a portion of the payload of the network packet to determine a type or characteristic associated with the network packet, such as whether the payload contains audio data, video data, text, a uniform resource identifier (URI), etc. In block 1910, the on-die core 1318 generates and transmits an indication of the determined corresponding host interface to the bare metal controller 1314. In some embodiments, in block 1912, the on-die core 1318 initiates the write of the network packet to the memory fabric 1304 or the host memory 1330 associated with a host CPU 1328 which corresponds to the identified host interface 1312.

Figure 14:
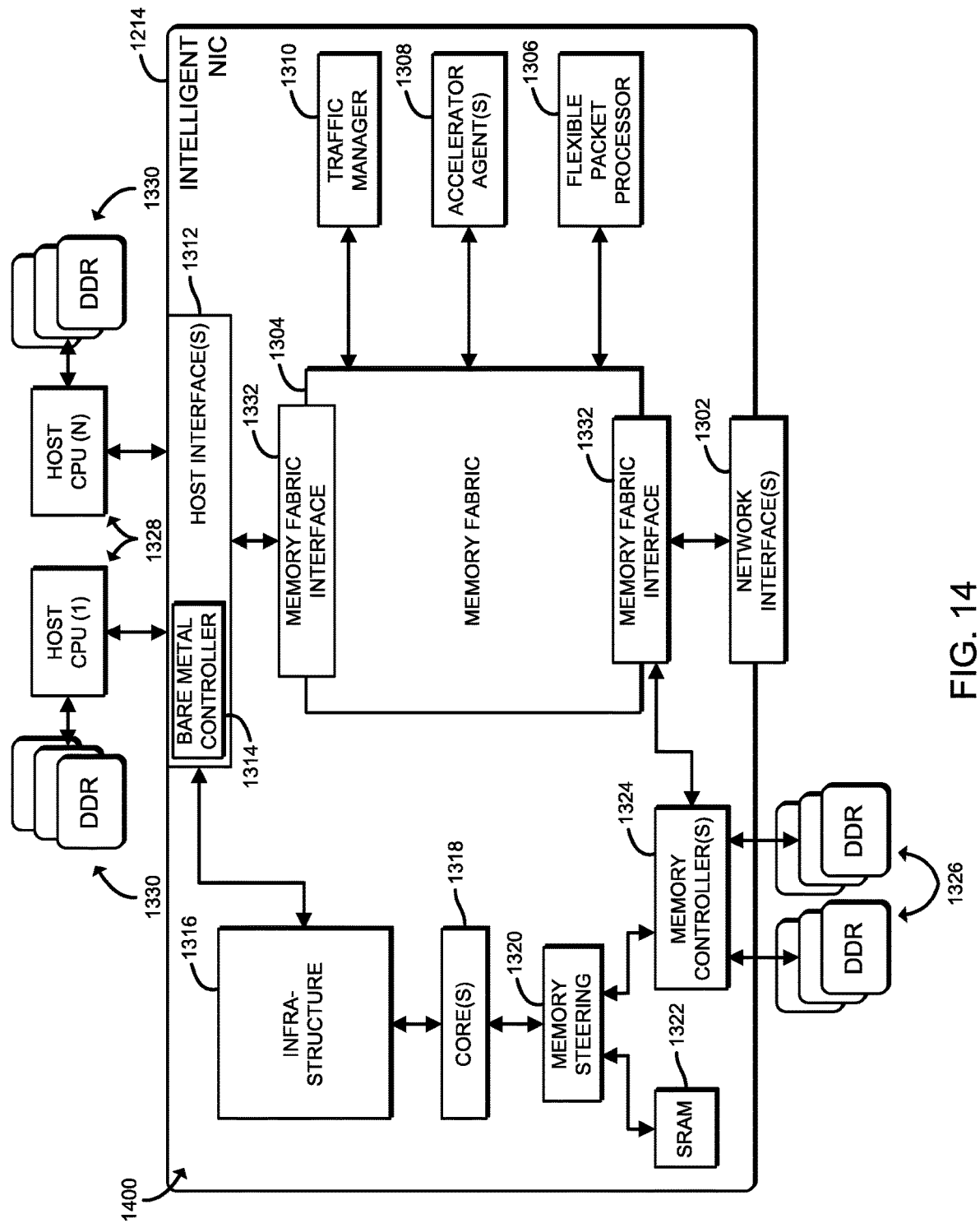
FIG. 14 is a simplified block diagram of at least one embodiment of another environment that may be established by the intelligent NIC of FIG. 12.
Figure 20:
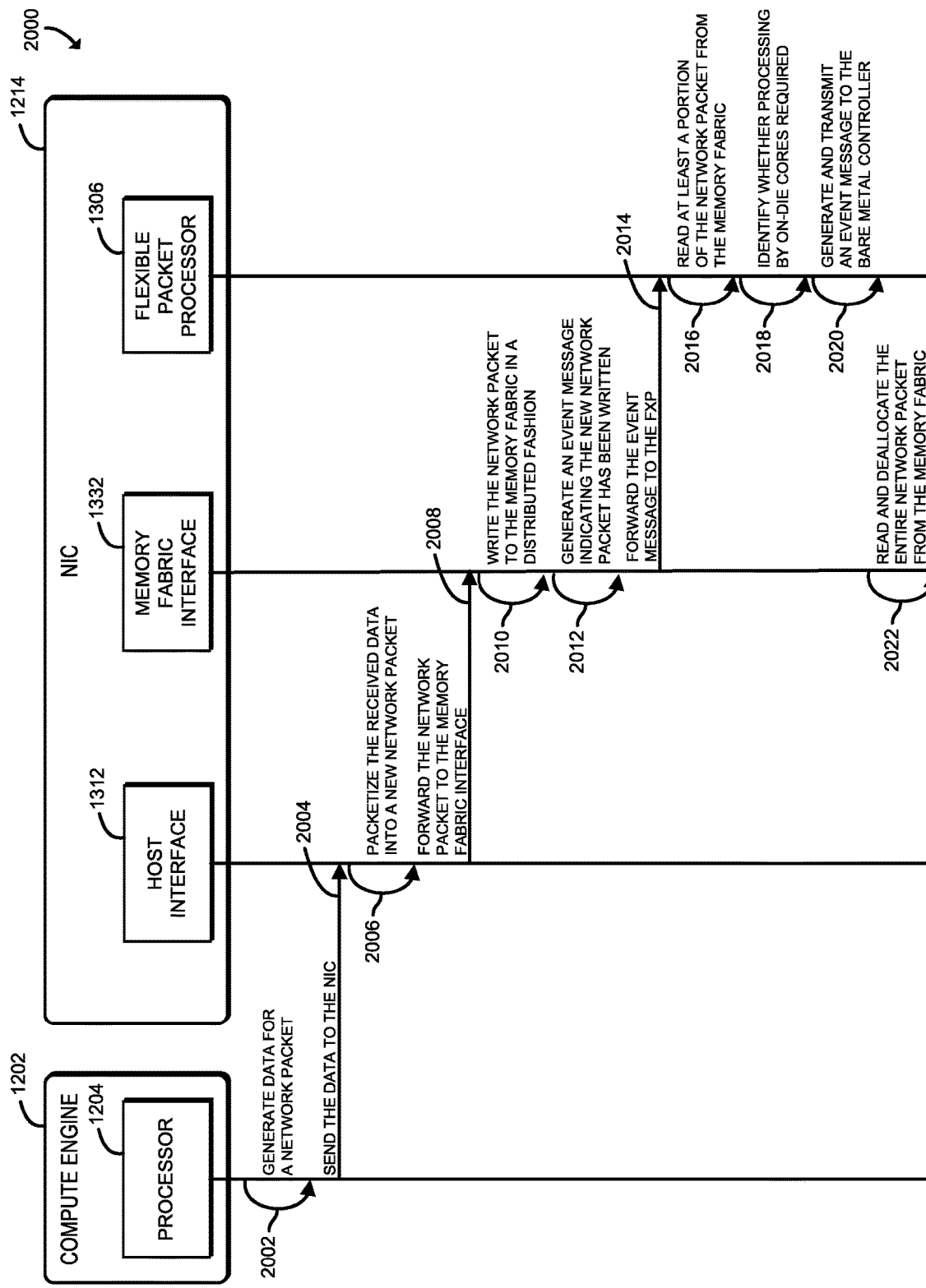
FIG. 20 is a simplified communication flow diagram of at least one embodiment for processing an outbound network packet that may be performed by a network interface of the intelligent NIC of FIGS. 13 and 14.

Referring now to FIG. 20, an embodiment of a communication flow 2000 for processing an outbound network packet includes the compute engine 1202 of FIG. 12 and the NIC of FIGS. 12-14. The illustrative communication flow 2000 includes a number of data flows, some of which may be executed separately or together, depending on the embodiment. In data flow 2002, the processor 1204 of the compute engine 1202 generates data for a network packet to be transmitted to another network device (not shown). In data flow 2004, the processor 1204 sends the data to the NIC 1214, or more particularly to one of the host interfaces 1312. In data flow 2006, the host interface 1312 packetizes the received data and, in data flow 2008, forwards the network packet to the memory fabric interface 1332.

In data flow 2010, the memory fabric interface 1332 writes the network packet to the memory fabric (e.g., the memory fabric 1304 of FIG. 13) in a distributed fashion (e.g., across multiple segments of the memory fabric 1304). In data flow 2012, the memory fabric interface 1332 generates an event message (e.g., a new network packet event message) indicating the new network packet has been written to the memory fabric 1304. In data flow 2014, the host fabric interface 1318 forwards the event message to the FXP 1306. It should be appreciated that, in some embodiments, the memory fabric interface 1332 may include some processing capability such that some analysis may be performed by the memory fabric interface 1332 without the need to involve the FXP 1306 (e.g., the event message may be sent directly to the bare metal controller 1314). For example, in such embodiments, the memory fabric interface 1332 may be configured to identify a flow associated with the network packet prior to sending the event message to the FXP 1306, which may be used by the FXP 1306 to perform one or more operations thereon (e.g., create a reserved region in a header of the network packet) before transmitting a subsequent event message to the bare metal controller as described in data flow 2020.

Upon receipt of the event message, in data flow 2016, the FXP 1306 fetches and reads at least a portion of the new network packet from the memory fabric 1304. To do so, it should be appreciated that the event message may include a pointer usable to identify the location in the memory fabric 1304 at which the new network packet has been stored. In data flow 2018, the FXP 1306 identifies whether additional processing by the on-die cores 1318 is required prior to transmission of the network packet from the NIC 1214 (e.g., via one of the network interfaces 1302). If so, in data flow 2020, the FXP 1306 generates and transmits an event message (e.g., a network packet transmit event message) to the bare metal controller 1314. Upon receipt, the bare metal controller 1314 is configured to perform the operations described in the method 1800 of FIG. 18. In data flow 2022, subsequent to having received an indication from the bare metal controller 1314 that the network packet is ready for transmission, the memory fabric interface 1332 reads and deallocates the entire network packet from the memory fabric 1304 for transmission to another network device.

Examples

Illustrative examples of the technologies disclosed herein are provided below. An embodiment of the technologies may include any one or more, and any combination of, the examples described below.

Example 1 includes a computing device for processing network packets by a network interface controller (NIC) of the computing device, the computing device comprising a packet processor and a controller device each communicatively coupled to a memory fabric of the NIC, wherein the NIC is to fetch, by the controller device and in response to having received a message from the packet processor that a network packet has been written to the memory fabric, at least a portion of a network packet from the memory fabric based on a memory fabric location pointer received with the message; read, by the controller device, the fetched portion of the network packet; write, by the controller device, an inbound descriptor to a location in a memory managed by the NIC; perform, by one or more on-die cores of the NIC, one or more operations on the fetched portion of the network packet as a function of information contained within the inbound descriptor; write, by the one or more on-die cores, an outbound descriptor to a location in a memory managed by the NIC; restructure, by the controller device, at least a portion of the fetched portion of the network packet as a function of information contained within the outbound descriptor; and write, by the controller device, the restructured portion of the network packet to the memory fabric.

Example 2 includes the subject matter of Example 1, and further including to store, by the controller device, the fetched portion of the network packet to a local temporary data storage managed by the NIC.

Example 3 includes the subject matter of any of Examples 1 and 2, and wherein to fetch the portion of the network packet from the memory fabric comprises to fetch at least a header of the network packet.

Example 4 includes the subject matter of any of Examples 1-3, and wherein to fetch the portion of the network packet from the memory fabric comprises to fetch a predetermined size amount of the network packet.

Example 5 includes the subject matter of any of Examples 1-4, and wherein the memory fabric location pointer corresponds to a location in the memory fabric in which a header of the network packet has been stored.

Example 6 includes the subject matter of any of Examples 1-5, and further including to shift, by the controller device and prior to having written the inbound descriptor, a header of the network packet a predetermined size amount to create a reserved region in the header.

Example 7 includes the subject matter of any of Examples 1-6, and further including to transmit, by the controller device and subsequent to having written the inbound descriptor, an interrupt request to the one or more on-die cores.

Example 8 includes the subject matter of any of Examples 1-7, and further including to shift, by the packet processor and prior to having transmitted the message to the controller device, a header of the network packet a predetermined size amount to create a reserved region in the header.

Example 9 includes the subject matter of any of Examples 1-8, and wherein to restructure the at least a portion of the fetched portion of the network packet as a function of the information contained within the outbound descriptor comprises to one of add one or more bytes to a structure of the portion of the network packet, remove one or more bytes from the structure of the portion of the network packet, or change a starting position of a pointer to a location in the memory fabric of the network packet.

Example 10 includes the subject matter of any of Examples 1-9, and further including to identify, by the controller device, a component of the NIC to perform a subsequent action on the network packet as a function of the outbound descriptor, and transmit another event message to the identified component, wherein the other event message is usable to identify the subsequent action to be performed and a location in the memory fabric of the network packet.

Example 11 includes the subject matter of any of Examples 1-10, and wherein to identify the component of the NIC comprises to identify an accelerator agent of the NIC to perform an acceleration operation on the network packet or a network interface of the NIC to transmit the network packet to another computing device.

Example 12 includes the subject matter of any of Examples 1-11, and further including to receive, by a network interface of the NIC, the network packet from another computing device; forward, by the network interface, the received network packet to a memory fabric interface of the memory fabric; write, by the memory fabric interface, the network packet to the memory fabric in a distributed fashion; transmit, by the memory fabric interface, an event message to the packet processor, wherein the message indicates the network packet has been written to the memory fabric and includes the memory fabric location pointer; and transmit, by the packet processor and upon receipt of the event message, the message to the controller device, wherein the message indicates the network packet has been written to the memory fabric and includes the memory fabric location pointer.

Example 13 includes the subject matter of any of Examples 1-12, and further including to determine, by the packet processor, whether a packet flow which corresponds to the received network packet is known; and transmit, by the packet processor and in response to a determination that the packet flow is not known, a host identifier request message to the controller device, wherein the host identifier request message is usable to indicate the packet flow which corresponds to the network packet is not known.

Example 14 includes the subject matter of any of Examples 1-13, and wherein to determine whether the packet flow is known comprises to read, by the on-die core of the NIC, a portion of the network packet from the location in the memory managed by the NIC at which the portion of the network packet has been stored and perform a lookup operation based at least on part on the read portion of the network packet to determine the packet flow.

Example 15 includes the subject matter of any of Examples 1-14, and further including to receive, by a host interface of the NIC, a network packet from the compute engine; forward, by the host interface, the network packet to a memory fabric interface of the memory fabric; write, by the memory fabric interface, the network packet to the memory fabric in a distributed fashion; transmit, by the memory fabric interface, an event message to the packet processor, wherein the event message indicates the network packet has been received from the compute engine; identify, by the packet processor, whether the network packet is to be processed by the one or more on-die cores; and transmit, by the packet processor and subsequent to having identifier the network packet is to be processed by the one or more on-die cores, another event message to the controller device, wherein the other event message indicates the network packet has been received and includes the memory fabric location pointer.

Example 16 includes a method for processing network packets by a network interface controller (NIC) of a computing device, the computing device comprising fetching, by a controller device of a network interface controller (NIC) of the computing device, and in response to having received a message from a packet processor of the NIC that a network packet has been written to a memory fabric of the NIC, at least a portion of a network packet from the memory fabric based on a memory fabric location pointer received with the message; reading, by the controller device, the fetched portion of the network packet; writing, by the controller device, an inbound descriptor to a location in a memory managed by the NIC; performing, by one or more on-die cores of the NIC, one or more operations on the fetched portion of the network packet as a function of information contained within the inbound descriptor; writing, by the one or more on-die cores, an outbound descriptor to a location in a memory managed by the NIC; restructuring, by the controller device, at least a portion of the fetched portion of the network packet as a function of information contained within the outbound descriptor; and writing, by the controller device, the restructured portion of the network packet to the memory fabric.

Example 17 includes the subject matter of Example 16, and further including storing, by the controller device, the fetched portion of the network packet to a local temporary data storage managed by the NIC.

Example 18 includes the subject matter of any of Examples 16 and 17, and wherein fetching the portion of the network packet from the memory fabric comprises fetching at least a header of the network packet.

Example 19 includes the subject matter of any of Examples 16-18, and wherein fetching the portion of the network packet from the memory fabric comprises fetching a predetermined size amount of the network packet.

Example 20 includes the subject matter of any of Examples 16-19, and wherein the memory fabric location pointer corresponds to a location in the memory fabric in which a header of the network packet has been stored.

Example 21 includes the subject matter of any of Examples 16-20, and further including shifting, by the controller device and prior to having written the inbound descriptor, a header of the network packet a predetermined size amount to create a reserved region in the header.

Example 22 includes the subject matter of any of Examples 16-21, and further including transmitting, by the controller device and subsequent to having written the inbound descriptor, an interrupt request to the one or more on-die cores.

Example 23 includes the subject matter of any of Examples 16-22, and further including shifting, by the packet processor and prior to having transmitted the message to the controller device, a header of the network packet a predetermined size amount to create a reserved region in the header.

Example 24 includes the subject matter of any of Examples 16-23, and wherein restructuring the at least a portion of the fetched portion of the network packet as a function of the information contained within the outbound descriptor comprises one of adding one or more bytes to a structure of the portion of the network packet, removing one or more bytes from the structure of the portion of the network packet, or changing a starting position of a pointer to a location in the memory fabric of the network packet.

Example 25 includes the subject matter of any of Examples 16-24, and further including identifying, by the controller device, a component of the NIC to perform a subsequent action on the network packet as a function of the outbound descriptor, and transmitting another event message to the identified component, wherein the other event message is usable to identify the subsequent action to be performed and a location in the memory fabric of the network packet.

Example 26 includes the subject matter of any of Examples 16-25, and wherein identifying the component of the NIC comprises identifying an accelerator agent of the NIC to perform an acceleration operation on the network packet or a network interface of the NIC to transmit the network packet to another computing device.

Example 27 includes the subject matter of any of Examples 16-26, and further including receiving, by a network interface of the NIC, the network packet from another computing device; forwarding, by the network interface, the received network packet to a memory fabric interface of the memory fabric; writing, by the memory fabric interface, the network packet to the memory fabric in a distributed fashion; transmitting, by the memory fabric interface, an event message to the packet processor, wherein the message indicates the network packet has been written to the memory fabric and includes the memory fabric location pointer; and transmitting, by the packet processor and upon receipt of the event message, the message to the controller device, wherein the message indicates the network packet has been written to the memory fabric and includes the memory fabric location pointer.

Example 28 includes the subject matter of any of Examples 16-27, and further including determining, by the packet processor, whether a packet flow which corresponds to the received network packet is known; and transmitting, by the packet processor and in response to a determination that the packet flow is not known, a host identifier request message to the controller device, wherein the host identifier request message is usable to indicate the packet flow which corresponds to the network packet is not known.

Example 29 includes the subject matter of any of Examples 16-28, and wherein determining whether the packet flow is known comprises (i) reading, by the on-die core of the NIC, a portion of the network packet from the location in the memory managed by the NIC at which the portion of the network packet has been stored and (ii) performing a lookup operation based at least on part on the read portion of the network packet to determine the packet flow.

Example 30 includes the subject matter of any of Examples 16-29, and further including receiving, by a host interface of the NIC, a network packet from the compute engine; forwarding, by the host interface, the network packet to a memory fabric interface of the memory fabric; writing, by the memory fabric interface, the network packet to the memory fabric in a distributed fashion; transmitting, by the memory fabric interface, an event message to the packet processor, wherein the event message indicates the network packet has been received from the compute engine; identifying, by the packet processor, whether the network packet is to be processed by the one or more on-die cores; and transmitting, by the packet processor and subsequent to having identifier the network packet is to be processed by the one or more on-die cores, another event message to the controller device, wherein the other event message indicates the network packet has been received and includes the memory fabric location pointer.

Example 31 includes one or more machine-readable storage media of a network interface controller (NIC) of a computing device comprising a plurality of instructions stored thereon that, when executed, cause the NIC of the computing device to perform the method of any of Examples 16-30.

Example 32 includes a computing device for processing network packets by a network interface controller (NIC) of the computing device, the computing device comprising one or more processors; and a network interface controller (NIC) having stored therein a plurality of instructions that, when executed by the NIC, cause the computing device to perform the method of any of Examples 16-30.

Example 33 includes a computing device for processing network packets by a network interface controller (NIC) of the computing device, the computing device comprising means for fetching, by a controller device of a network interface controller (NIC) of the computing device, and in response to having received a message from a packet processor of the NIC that a network packet has been written to a memory fabric of the NIC, at least a portion of a network packet from the memory fabric based on a memory fabric location pointer received with the message; means for reading, by the controller device, the fetched portion of the network packet; means for writing, by the controller device, an inbound descriptor to a location in a memory managed by the NIC; means for performing, by one or more on-die cores of the NIC, one or more operations on the fetched portion of the network packet as a function of information contained within the inbound descriptor; means for writing, by the one or more on-die cores, an outbound descriptor to a location in a memory managed by the NIC; means for restructuring, by the controller device, at least a portion of the fetched portion of the network packet as a function of information contained within the outbound descriptor; and means for writing, by the controller device, the restructured portion of the network packet to the memory fabric.

Example 34 includes the subject matter of Example 33, and further including means for storing, by the controller device, the fetched portion of the network packet to a local temporary data storage managed by the NIC.

Example 35 includes the subject matter of any of Examples 33 and 34, and wherein the means for fetching the portion of the network packet from the memory fabric comprises means for fetching at least a header of the network packet.

Example 36 includes the subject matter of any of Examples 33-35, and wherein the means for fetching the portion of the network packet from the memory fabric comprises means for fetching a predetermined size amount of the network packet.

Example 37 includes the subject matter of any of Examples 33-36, and wherein the memory fabric location pointer corresponds to a location in the memory fabric in which a header of the network packet has been stored.

Example 38 includes the subject matter of any of Examples 33-37, and further including means for shifting, by the controller device and prior to having written the inbound descriptor, a header of the network packet a predetermined size amount to create a reserved region in the header.

Example 39 includes the subject matter of any of Examples 33-38, and further including means for transmitting, by the controller device and subsequent to having written the inbound descriptor, an interrupt request to the one or more on-die cores.

Example 40 includes the subject matter of any of Examples 33-39, and further including means for shifting, by the packet processor and prior to having transmitted the message to the controller device, a header of the network packet a predetermined size amount to create a reserved region in the header.

Example 41 includes the subject matter of any of Examples 33-40, and wherein the means for restructuring the at least a portion of the fetched portion of the network packet as a function of the information contained within the outbound descriptor comprises one of (i) means for adding one or more bytes to a structure of the portion of the network packet, (ii) means for removing one or more bytes from the structure of the portion of the network packet, or (iii) means for changing a starting position of a pointer to a location in the memory fabric of the network packet.

Example 42 includes the subject matter of any of Examples 33-41, and further including means for (i) identifying, by the controller device, a component of the NIC to perform a subsequent action on the network packet as a function of the outbound descriptor, and (ii) transmitting another event message to the identified component, wherein the other event message is usable to identify the subsequent action to be performed and a location in the memory fabric of the network packet.

Example 43 includes the subject matter of any of Examples 33-42, and wherein the means for identifying the component of the NIC comprises means for identifying an accelerator agent of the NIC to perform an acceleration operation on the network packet or a network interface of the NIC to transmit the network packet to another computing device.

Example 44 includes the subject matter of any of Examples 33-43, and further including means for receiving, by a network interface of the NIC, the network packet from another computing device; means for forwarding, by the network interface, the received network packet to a memory fabric interface of the memory fabric; means for writing, by the memory fabric interface, the network packet to the memory fabric in a distributed fashion; means for transmitting, by the memory fabric interface, an event message to the packet processor, wherein the message indicates the network packet has been written to the memory fabric and includes the memory fabric location pointer; and means for transmitting, by the packet processor and upon receipt of the event message, the message to the controller device, wherein the message indicates the network packet has been written to the memory fabric and includes the memory fabric location pointer.

Example 45 includes the subject matter of any of Examples 33-44, and further including means for determining, by the packet processor, whether a packet flow which corresponds to the received network packet is known; and means for transmitting, by the packet processor and in response to a determination that the packet flow is not known, a host identifier request message to the controller device, wherein the host identifier request message is usable to indicate the packet flow which corresponds to the network packet is not known.

Example 46 includes the subject matter of any of Examples 33-45, and wherein the means for determining whether the packet flow is known comprises means for (i) reading, by the on-die core of the NIC, a portion of the network packet from the location in the memory managed by the NIC at which the portion of the network packet has been stored and (ii) performing a lookup operation based at least on part on the read portion of the network packet to determine the packet flow.

Example 47 includes the subject matter of any of Examples 33-46, and further including means for receiving, by a host interface of the NIC, a network packet from the compute engine; means for forwarding, by the host interface, the network packet to a memory fabric interface of the memory fabric; means for writing, by the memory fabric interface, the network packet to the memory fabric in a distributed fashion; means for transmitting, by the memory fabric interface, an event message to the packet processor, wherein the event message indicates the network packet has been received from the compute engine; means for identifying, by the packet processor, whether the network packet is to be processed by the one or more on-die cores; and means for transmitting, by the packet processor and subsequent to having identifier the network packet is to be processed by the one or more on-die cores, another event message to the controller device, wherein the other event message indicates the network packet has been received and includes the memory fabric location pointer.

The invention claimed is:

1. A computing device for processing network packets, the computing device comprising:
a network interface controller (NIC), wherein the NIC comprises a packet processor, a controller device, a memory fabric, and one or more on-die cores, wherein the packet processor and the controller device are each communicatively coupled to the memory fabric, wherein the NIC is to:
fetch, by the controller device and in response to having received a message from the packet processor that a network packet has been written to the memory fabric, at least a portion of the network packet from the memory fabric based on a memory fabric location pointer received with the message;
read, by the controller device, the fetched portion of the network packet;
write, by the controller device, an inbound descriptor to a location in a memory managed by the NIC;
perform, by the one or more on-die cores of the NIC, one or more operations on the fetched portion of the network packet as a function of information contained within the inbound descriptor;
write, by the one or more on-die cores, an outbound descriptor to a location in a memory managed by the NIC;
restructure, by the controller device, at least a portion of the fetched portion of the network packet as a function of at least part of the outbound descriptor; and
write, by the controller device, the restructured portion of the network packet to the memory fabric.

2. The computing device of claim 1, wherein the NIC is further to store, by the controller device, the fetched portion of the network packet to a local temporary data storage managed by the NIC.

3. The computing device of claim 1, wherein to fetch the portion of the network packet from the memory fabric comprises to fetch one of a header of the network packet or a predetermined size amount of the network packet.

4. The computing device of claim 1, wherein the NIC is further to shift, by the controller device and prior to having written the inbound descriptor, a header of the network packet a predetermined size amount to create a reserved region in the header.

5. The computing device of claim 1, wherein the NIC is further to transmit, by the controller device and subsequent to having written the inbound descriptor, an interrupt request to the one or more on-die cores.

6. The computing device of claim 1, wherein the NIC is further to shift, by the packet processor and prior to having transmitted the message to the controller device, a header of the network packet a predetermined size amount to create a reserved region in the header.

7. The computing device of claim 1, wherein to restructure the at least a portion of the fetched portion of the network packet as a function of the at least part of the outbound descriptor comprises to one of add one or more bytes to a structure of the portion of the network packet, remove one or more bytes from the structure of the portion of the network packet, or change a starting position of a pointer to a location in the memory fabric of the network packet.

8. The computing device of claim 1, wherein the NIC is further to identify, by the controller device, a component of the NIC to perform a subsequent action on the network packet as a function of the outbound descriptor, and transmit another event message to the identified component, wherein the other event message is usable to identify the subsequent action to be performed and a location in the memory fabric of the network packet.

9. The computing device of claim 8, wherein to identify the component of the NIC comprises to identify an accelerator agent of the NIC to perform an acceleration operation on the network packet or a network interface of the NIC to transmit the network packet to another computing device.

10. The computing device of claim 1, wherein the NIC is further to:
receive, by a network interface of the NIC, the network packet from another computing device;
forward, by the network interface, the received network packet to a memory fabric interface of the memory fabric;
write, by the memory fabric interface, the network packet to the memory fabric in a distributed fashion;
transmit, by the memory fabric interface, an event message to the packet processor, wherein the message indicates the network packet has been written to the memory fabric and includes the memory fabric location pointer; and
transmit, by the packet processor and upon receipt of the event message, the message to the controller device, wherein the message indicates the network packet has been written to the memory fabric and includes the memory fabric location pointer.

11. The computing device of claim 1, wherein the NIC is further to:
determine, by the packet processor, whether a packet flow which corresponds to the received network packet is known; and
transmit, by the packet processor and in response to a determination that the packet flow is not known, a host identifier request message to the controller device, wherein the host identifier request message is usable to indicate the packet flow which corresponds to the network packet is not known.

12. The computing device of claim 11, wherein to determine whether the packet flow is known comprises to read, by the one or more on-die cores of the NIC, a portion of the network packet from the location in the memory managed by the NIC at which the portion of the network packet has been stored and perform a lookup operation based at least on part on the read portion of the network packet to determine the packet flow.

13. The computing device of claim 1, wherein the NIC is further to:
receive, by a host interface of the NIC, a network packet from a compute engine of the computing device;
forward, by the host interface, the network packet to a memory fabric interface of the memory fabric;
write, by the memory fabric interface, the network packet to the memory fabric in a distributed fashion;
transmit, by the memory fabric interface, an event message to the packet processor, wherein the event message indicates the network packet has been received from the compute engine;
identify, by the packet processor, whether the network packet is to be processed by the one or more on-die cores; and
transmit, by the packet processor and subsequent to having identifier the network packet is to be processed by the one or more on-die cores, another event message to the controller device, wherein the other event message indicates the network packet has been received and includes the memory fabric location pointer.

14. One or more non-transitory machine-readable storage media comprising a plurality of instructions stored thereon that, in response to being executed, cause a computing device to:
fetch, by a controller device of a network interface controller (NIC) of the computing device, and in response to having received a message from a packet processor of the NIC that a network packet has been written to a memory fabric of the NIC, at least a portion of the network packet from the memory fabric based on a memory fabric location pointer received with the message, wherein the NIC comprises the packet processor, the controller device, the memory fabric, and one or more on-die cores;
read, by the controller device, the fetched portion of the network packet;
write, by the controller device, an inbound descriptor to a location in a memory managed by the NIC;
perform, by the one or more on-die cores of the NIC, one or more operations on the fetched portion of the network packet as a function of information contained within the inbound descriptor;
write, by the one or more on-die cores, an outbound descriptor to a location in a memory managed by the NIC;
restructure, by the controller device, at least a portion of the fetched portion of the network packet as a function of at least part of the outbound descriptor; and
write, by the controller device, the restructured portion of the network packet to the memory fabric.

15. The one or more non-transitory machine-readable storage media of claim 14, wherein the plurality of instructions further cause the computing device to store, by the controller device, the fetched portion of the network packet to a local temporary data storage managed by the NIC.

16. The one or more non-transitory machine-readable storage media of claim 14, wherein to fetch the portion of the network packet from the memory fabric comprises to fetch one of a header of the network packet or a predetermined size amount of the network packet.

17. The one or more non-transitory machine-readable storage media of claim 14, wherein the plurality of instructions further cause the computing device to shift, by the controller device and prior to having written the inbound descriptor, a header of the network packet a predetermined size amount to create a reserved region in the header.

18. The one or more non-transitory machine-readable storage media of claim 14, wherein the plurality of instructions further cause the computing device to transmit, by the controller device and subsequent to having written the inbound descriptor, an interrupt request to the one or more on-die cores.

19. The one or more non-transitory machine-readable storage media of claim 14, wherein the plurality of instructions further cause the computing device to shift, by the packet processor and prior to having transmitted the message to the controller device, a header of the network packet a predetermined size amount to create a reserved region in the header.

20. The one or more non-transitory machine-readable storage media of claim 14, wherein to restructure the at least a portion of the fetched portion of the network packet as a function of the at least part of the outbound descriptor comprises one of to add one or more bytes to a structure of the portion of the network packet, remove one or more bytes from the structure of the portion of the network packet, or change a starting position of a pointer to a location in the memory fabric of the network packet.

21. The one or more non-transitory machine-readable storage media of claim 14, wherein the plurality of instructions further cause the computing device to identify, by the controller device, a component of the NIC to perform a subsequent action on the network packet as a function of the outbound descriptor, and transmit another event message to the identified component, wherein the other event message is usable to identify the subsequent action to be performed and a location in the memory fabric of the network packet.

22. The one or more non-transitory machine-readable storage media of claim 21, wherein the plurality of instructions further cause the computing device to:
receive, by a network interface of the NIC, the network packet from another computing device;
forward, by the network interface, the received network packet to a memory fabric interface of the memory fabric;
write, by the memory fabric interface, the network packet to the memory fabric in a distributed fashion;
transmit, by the memory fabric interface, an event message to the packet processor, wherein the message indicates the network packet has been written to the memory fabric and includes the memory fabric location pointer; and
transmit, by the packet processor and upon receipt of the event message, the message to the controller device, wherein the message indicates the network packet has been written to the memory fabric and includes the memory fabric location pointer.

23. A method for processing network packets by a computing device, the method comprising:
fetching, by a controller device of a network interface controller (NIC) of the computing device, and in response to having received a message from a packet processor of the NIC that a network packet has been written to a memory fabric of the NIC, at least a portion of the network packet from the memory fabric based on a memory fabric location pointer received with the message, wherein the NIC comprises the packet processor, the controller device, the memory fabric, and one or more on-die cores;
reading, by the controller device, the fetched portion of the network packet;
writing, by the controller device, an inbound descriptor to a location in a memory managed by the NIC;
performing, by the one or more on-die cores of the NIC, one or more operations on the fetched portion of the network packet as a function of information contained within the inbound descriptor;
writing, by the one or more on-die cores, an outbound descriptor to a location in a memory managed by the NIC;
restructuring, by the controller device, at least a portion of the fetched portion of the network packet as a function of at least part of the outbound descriptor; and
writing, by the controller device, the restructured portion of the network packet to the memory fabric.

24. The method of claim 23, further comprising:
receiving, by a network interface of the NIC, the network packet from another computing device;
forwarding, by the network interface, the received network packet to a memory fabric interface of the memory fabric;
writing, by the memory fabric interface, the network packet to the memory fabric in a distributed fashion;
transmitting, by the memory fabric interface, an event message to the packet processor, wherein the message indicates the network packet has been written to the memory fabric and includes the memory fabric location pointer; and
transmitting, by the packet processor and upon receipt of the event message, the message to the controller device, wherein the message indicates the network packet has been written to the memory fabric and includes the memory fabric location pointer.

25. The method of claim 23, further comprising:
receiving, by a host interface of the NIC, a network packet from a compute engine of the computing device;
forwarding, by the host interface, the network packet to a memory fabric interface of the memory fabric;
writing, by the memory fabric interface, the network packet to the memory fabric in a distributed fashion;
transmitting, by the memory fabric interface, an event message to the packet processor, wherein the event message indicates the network packet has been received from the compute engine;
identifying, by the packet processor, whether the network packet is to be processed by the one or more on-die cores; and
transmitting, by the packet processor and subsequent to having identified the network packet is to be processed by the one or more on-die cores, another event message to the controller device, wherein the other event message indicates the network packet has been received and includes the memory fabric location pointer.

* * * * *